(12) United States Patent
Flowers

(10) Patent No.: US 6,661,405 B1
(45) Date of Patent: Dec. 9, 2003

(54) ELECTROGRAPHIC POSITION LOCATION APPARATUS AND METHOD

(75) Inventor: Mark Flowers, Los Gatos, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 09/574,499

(22) Filed: May 19, 2000

Related U.S. Application Data

(60) Provisional application No. 60/200,722, filed on Apr. 27, 2000, and provisional application No. 60/200,960, filed on May 1, 2000.

(51) Int. Cl.[7] ................................................ G09G 5/00
(52) U.S. Cl. .................................... 345/173; 345/169
(58) Field of Search ........................ 345/173–178, 345/169

(56) References Cited

U.S. PATENT DOCUMENTS

| | | | |
|---|---|---|---|
| 2,182,334 A | 12/1939 | Crespo | 40/538 |
| 2,932,907 A | 4/1960 | Stieber et al. | 434/145 |
| 3,292,489 A | 12/1966 | Johnson et al. | 353/25 |
| 3,304,612 A | 2/1967 | Proctor et al. | 30/394 |
| 3,798,370 A | 3/1974 | Hurst | 178/19 |
| 3,911,215 A | 10/1975 | Hurst et al. | 178/18 |
| 3,921,165 A | 11/1975 | Dym | 340/347 |
| 4,071,689 A | 1/1978 | Talmage | 178/18 |
| 4,136,336 A | 1/1979 | Abe et al. | 340/365 |
| 4,220,815 A | 9/1980 | Gibson et al. | 178/18 |
| 4,456,787 A | 6/1984 | Schlosser et al. | 178/19 |
| 4,492,819 A | 1/1985 | Rodgers et al. | 178/18 |
| 4,570,149 A | 2/1986 | Thornburg et al. | 338/114 |
| 4,603,231 A | 7/1986 | Reiffel et al. | 178/19.06 |
| 4,630,209 A | 12/1986 | Saito et al. | 364/444 |
| 4,649,232 A | 3/1987 | Nakamura et al. | 178/18 |
| 4,650,926 A | 3/1987 | Nakamura et al. | 178/18.02 |
| 4,681,548 A | 7/1987 | Lemelson | 434/311 |
| 4,686,332 A | 8/1987 | Greanias et al. | 178/19 |
| 4,706,090 A | 11/1987 | Hashiguchi et al. | 342/41 |
| 4,802,092 A | 1/1989 | Harte | 364/411 |
| 4,822,957 A | 4/1989 | Talmage, Jr. et al. | 178/18 |
| 4,853,493 A | 8/1989 | Schlosser et al. | 178/18 |
| 4,853,498 A | 8/1989 | Meadows et al. | 178/19 |
| 4,853,499 A | 8/1989 | Watson | 178/19 |
| 4,913,463 A | 4/1990 | Tlapek et al. | 281/49 |
| 4,922,061 A | 5/1990 | Meadows et al. | 178/19 |
| 4,987,424 A | 1/1991 | Tamura et al. | 343/795 |
| 5,007,085 A | 4/1991 | Greanias et al. | 178/18 |
| 5,030,117 A | 7/1991 | Delorme | 434/130 |
| 5,057,024 A | 10/1991 | Sprott et al. | 434/146 |
| 5,088,928 A | 2/1992 | Chan | 434/339 |
| 5,113,178 A | 5/1992 | Yasuda et al. | 434/146 |
| 5,117,071 A | 5/1992 | Greanias et al. | 178/19 |
| 5,149,919 A | 9/1992 | Greanias et al. | 178/19 |
| 5,157,384 A | 10/1992 | Greanias et al. | 345/179 |
| 5,220,136 A | 6/1993 | Kent | 178/18 |

(List continued on next page.)

FOREIGN PATENT DOCUMENTS

| | | |
|---|---|---|
| JP | S57-38486 | 3/1982 |
| JP | S61-46516 | 3/1986 |
| JP | H5-137846 | 6/1993 |
| JP | H5-217688 | 8/1993 |

OTHER PUBLICATIONS

British Micro, "Operating Guide to Grafpad", 1982, 28pp.

*Primary Examiner*—Dennis-Doon Chow
*Assistant Examiner*—Alecia D. Nelson
(74) *Attorney, Agent, or Firm*—Pepi Ross

(57) ABSTRACT

An apparatus for use in an electrographic position sensing system comprises an antenna system and a signal strength detector. In one embodiment, the antenna system comprises two antennas. The detector measures the signal strength from each antenna. A microprocessor contains an algorithm to calculate the position of the detector near the antennas.

9 Claims, 23 Drawing Sheets

U.S. PATENT DOCUMENTS

| | | | |
|---|---|---|---|
| 5,283,558 A | 2/1994 | Chan | 345/168 |
| 5,417,575 A | 5/1995 | McTaggert | 434/317 |
| 5,438,168 A | 8/1995 | Wolfe et al. | 178/20 |
| 5,485,176 A | 1/1996 | Ohara et al. | 345/173 |
| 5,506,375 A | 4/1996 | Kikuchi | 178/18 |
| 5,575,659 A | 11/1996 | King et al. | 434/467 |
| 5,644,321 A | 7/1997 | Benham | 343/826 |
| 5,670,886 A | 9/1997 | Wolff et al. | 324/644 |
| 5,686,705 A | 11/1997 | Conroy et al. | 178/19 |
| 5,804,773 A | 9/1998 | Wilson et al. | 178/19 |
| 5,851,119 A | 12/1998 | Sharpe, III et al. | 434/317 |
| 5,877,458 A | 3/1999 | Flowers | 178/18.01 |
| 5,959,586 A | 9/1999 | Benham et al. | 343/713 |
| 6,052,117 A | 4/2000 | Ohara et al. | 345/173 |

ELECTROGRAPHIC POSITION LOCATION APPARATUS AND METHOD

This application is based on and claims the priority of provisional patent application Ser. No. 60/200,722, filed on Apr. 27, 2000, incorporated herein by reference, and provisional patent application Ser. No. 60/200,960, filed on May 1, 2000, Ser. No. (to be assigned), incorporated herein by reference.

BACKGROUND OF THE INVENTION

There are a variety of games, toys, and interactive learning devices in which a stylus is used to point to a region on a surface in order to input data or questions. There are several technologies to determine the position of a stylus on a sensing surface. One approach is to embed an array of pressure sensitive switches in the sensing surface, such as membrane switches. However, conventional membrane switches have limited resolution. Another approach consists of arrays of capacitive or inductive elements whose impedance is altered by bringing the stylus into contact with the surface. However, a disadvantage of this approach is that a large number of pixel elements are required to achieve a high resolution. Moreover, since capacitive and inductive effects are typically small, the stylus must be brought into close proximity to the pixel in order to obtain a strong position signal.

In many applications it is desirable to be able to determine the position of a stylus disposed a short distance away (e.g., 1 mm to 2 cm) from an electrically active surface. In many consumer products it is desirable to protect electrically active elements with a protective layer of plastic which is thick enough to provide both mechanical and electrical insulation. The insulating material, such as a layer of plastic, may also be patterned with numbers, indicia, symbols, and drawings which facilitate the user inputting data by pointing to a number, indicia, symbol, or drawing disposed on the surface of the plastic. Other applications include systems in which the number, indicia, symbol, or drawing is disposed on a top (open) page of a booklet. The position of a pointer disposed on the open page of the booklet may be sensed even though the pointer is separated from the active surface by the thickness of the booklet.

An electrographic sensor unit and method based upon a geometric algorithm that is described in U.S. Pat. No. 5,686,705 "Surface Position Location System and Method" and U.S. Pat. No. 5,877,458 "Surface Position Location System And Method," which is assigned to the assignee of the present invention. According to the teachings of U.S. Pat. Nos. 5,877,458 and 5,686,705 the position of a stylus is determined by calculating the intersection point of equipotential lines based upon the measured signal strength received by the stylus. The contents of U.S. Pat. Nos. 5,686,705 and 5,877,458 are hereby incorporated by reference in the present application.

FIGS. 1–4 show the general principals of the geometric location method of U.S. Pat. Nos. 5,686,705 and 5,877,458. FIG. 1 is a simplified geometry illustrating the basic principles of operation. As shown in FIG. 1, a two or three dimensional conductive surface has a selected resistivity. In the embodiment of FIG. 1, three electrical contacts 12, 14, and 16 are connected to conductors 24, 26, and 28, respectively, to a processor 30. Also connected to processor 30 is conductor 18 with stylus 20 having a tip 22 for the user to indicate a position on the surface 10 that is of interest to the user. As shown in FIG. 2, when a user selects a point, P, on resistive surface 10, a series of field potential measurements are performed to calculate the position of the stylus. A DC offset value is determined with no radio-frequency (rf) signals applied to any of the contacts 12, 14, and 16. A second measurement is made by applying an equal amplitude rf signal to all three contacts 12, 14, and 16, and processor 30 measures the full-scale signal value via stylus 20. A third measurement is made by applying an rf signal to one of the contacts, such as contact 12, with a second contact grounded, such as contact 14. The signal measurement made by stylus 20 will lie somewhere along an equipotential line between those two contacts (i.e., line X in FIG. 2). A fourth measurement is made by applying the signal to, and grounding a different pair of contacts, say 12 and 16, and the signal measurement made with stylus 20 which will be somewhere along an equipotential line between those two contacts (i.e., line Y in FIG. 2) with the position of the stylus 20 being the intersection of lines X and Y. For the. purposes of illustration, lines X and Y are shown as straight lines. More generally the actual position of the stylus on the surface can be determined using mathematically or empirically determined models of the signal level gradients for the surface material with curved equipotential lines.

FIG. 3 illustrates an embodiment of an electrographic sensor system of U.S. Pat. No. 5,877,458 having a rectangular shaped piece of conductive material as sheet 100. Afixed near the edge of sheet 100, and making electrical contact thereto, are contacts 102, 104, and 106. Connected between contacts 102, 104, and 106 on sheet 100 and contacts 126, 128, and 130 of signal generator 122, respectively, are electrically conductive leads 108, 110, and 112. Signal generator 122 includes an rf generator 124, amplifier 134, and switches 132 and 136 to determine which signals are fed to contacts 126, 128, and 130. The position of switches 132 and 136 is controlled via cables 138 and 140, respectively, from microprocessor 142 to select which contacts 102, 104, and 106 receive an normal or inverted rf signal.

Stylus 116 contains a receiving antenna and is coupled to signal measurement stage 120 via cable 118. The signal is demodulated and turned into a digital signal via demodulator 144 and analog to digital converter (ADC) 146. ADC 146 presents the digitized signal to microprocessor 142. Microprocessor 142 includes RAM 145, ROM 147, a clock 148 to contain information related to the position that has been pre-stored along with an audio card 150 and speaker 154 or monitor 152 to output information on the selected area.

When an rf signal is coupled to one or more of the contacts 102, 104, and 106 the signal radiates through the conductive material of sheet 100. Between a given set of energized contacts, such as contacts 102 and 104, a signal level equipotential map 114A exists because of the distributed resistance in the conductive material of sheet 100. The signal level equipotential map includes the shape and values of the equipotential lines and may be stored in the memory of the microprocessor or the ROM 147. The shape of the these equipotential lines may, in principal, be calculated by finding the unique solution of mathematical equations or may be determined empirically. Additionally, there will be a signal equipotential map for other sets of energized contacts, such as equipotential map 114B for energized contacts 102 and 106. The measurement of the signal strength received at the stylus for a particular set of energized contacts may be used to calculate which equipotential line the stylus lies on. The measurement of two sets of energized contacts with substantially orthogonal equipotential lines permits the position of the stylus to be calculated, as indicated by point P of FIG. 3.

FIG. 4 has similar elements as for FIG. 3 as applied to a globe having two hemispherical conducting surfaces 701 and 702. Insulating map surfaces 601 and 602, containing details of world geography, are shaped to house hemispherical surfaces 701 and 702. Hemisphere 701 has contacts 710, 711, and 712. Hemisphere 702 has contacts 740, 741, and 742. Switches 770, 771, 772, and 773 along with cables 730, 750 and leads 760, 761 of signal generator 722 are configured so that each hemisphere 701 and 701 is driven in a manner similar to that of sheet 100. However, the equipotential maps for a hemispherical surface energized by two contacts, such as contacts 710 and 711, is typically more complex than for sheet 100 because of the spherical geometry. Additionally the mathematical algorithms must be calculated in spherical coordinates.

The electrographic apparatus and method of U.S. Pat. Nos. 5,686,705 and 5,877,458 has many applications, such as interactive globes. One advantage of the electrographic sensor technology of U.S. Pat. Nos. 5,686,705 and 5,877,458 is that the mechanical construction is comparatively simple and inexpensive. The conductive surface 100 or 701, 702 may be formed using a variety of deposited or coated materials. The position resolution is superior to many competing technologies, making it desirable for a variety of educational toys. For many applications the position of the stylus may be calculated to within several millimeters, making the electrographic apparatus of U.S. Pat. Nos. 5,686,705 and 5,877,458 useful in a variety of interactive games, such as the EXPLORER GLOBE™, sold by LeapFrog Toys of Emeryville, Calif. However, the inventors of the present application have recognized several drawbacks to the electrographic apparatus of U.S. Pat. Nos. 5,686,705 and 5,877,458. One drawback is that significant electronic memory and computing time is required to perform the mathematical calculations. In order to convert measured signal strengths into position data an equipotential map or equation is useful. The equipotential lines between energized point contacts on solid two-dimensional surfaces, or surfaces having uniform resistivity, have non-linear, non-parallel and curved contours which lead to complicated algorithms for position determination. The complicated algorithms, in turn, result in relatively expensive and slow electronics. Additionally, in some topologies, such as that of hemisphere 701, the curved geometry further complicates the calculation of the shape of the equipotential lines. Consequently, significant memory and computing time is required to perform each position calculation.

Another drawback with the electrographic location position sensing system of U.S. Pat. Nos. 5,686,705 and 5,877,458 is that the position sensing resolution tends to degrade towards the edges and corners of the active surface. The position sensing method of U.S. Pat. Nos. 5,686,705 and 5,877,458 is based upon calculating the intersection of equipotential lines from different pairs of energized contacts. However, the equipotential lines tend to be parallel near the edges and corner of common surface shapes. As is well known, it is difficult to obtain accurate measurements of the position of a point based upon the intersection of two nearly parallel lines because a small empirical variation in measured data produces large variations in the calculated intersection point. Consequently, position resolution will tend be poor in regions of surface 100 or 701 where the equipotential lines of different pairs of energized contacts are nearly parallel. Experiments by the inventors with hemispheres 701, 702 similar to those shown in FIG. 4 indicate that there is a region around the rim of a hemisphere 701, 702 with greatly reduced position resolution capability, which the inventors attribute to nearly parallel equipotential lines near the edge of a hemisphere 701, 702. This makes it difficult, for example, to design an interactive learning globe in which the user can point to small countries located close to the equator (e.g., Equatorial Guinea) to obtain information on the country. Similarly a rectangular conductive surface, such as surface 100, there also tends to be a region of reduced resolution near the edges of surface 100, making it difficult, for example, to identify small countries or regions located on the edge of a planar map. Further the equipotential lines for a planar surface of uniform resistance are curved and generally less orthogonal and therefore more complex than is desirable as illustrated in FIGS. 5A and 5B. This results in complex and slow mathematical algorithms.

Common techniques to form a continuous resistive coating on a surface 100 or 701 result in significant spatial variations in thickness and/or resistivity. In a single fabrication lot there can be substantial variations in the electrical resistance of each surface. This variation in resistivity across the sensing surface can significantly effect the contours of the equipotential lines. Therefore, it is necessary to compensate for those effects with a two-dimensional algorithm that leads to complex and time-consuming manufacturing processes. Consequently, a large number of data points are required to accurately map the equipotential lines. Additionally, a large amount of data must typically be stored in an equipotential map. This increases product cost.

An electrographic position sensing system using a similar calculation to U.S. Pat. Nos. 5,686,705 and 5,877,458 is desirable because of the potential for high accuracy, low manufacturing cost, and comparatively simple construction. However, previously known electrographic position sensing systems suffer from the problems of reduced resolution along edge regions because of the substantially parallel equipotential lines disposed along edge regions, the requirement of significant computational memory and computing time to calculate a position based upon complicated equipotential contours, and the need to perform complicated calibration procedures to map the equipotential lines.

What is desired is an improved electrographic apparatus and method providing improved control of the equipotential signal contours.

SUMMARY OF THE INVENTION

The present invention is generally directed towards an electrographic position sensing system, including antenna apparatus to generate electropotential gradients in an electrographic position detecting system, a method of manufacturing the antenna apparatus, and the use of the antenna apparatus in an electrographic position system.

The novel and inventive antenna apparatus described herein can radiate a two dimensional electric field potential that can be properly described by set of vertical or horizontal equipotential field lines, each line having a different potential value associated with it. The magnitude and gradient of the radiated field lines is easily designed into the antenna apparatus. Because the generated field potential is easily calculated as a function of the antenna design, it can be used to locate which line a receiving antenna lies on. As a receiving antenna is moved from one equipotential line to another, it will pick up the field strength of the line over which it is located. If the receiving antenna is placed in a single location over the radiating (or transmitting) antenna, the magnitude of the potential the antenna senses will reveal on which equipotential line the receiving antenna is located.

If a user desires to know more about the position of the receiving antenna than the equipotential line on which it resides, a second transmitting antenna can be used. The second transmitting antenna can be oriented a 90° to the first transmitting antenna. In this configuration, a user can cause first one antenna to broadcast a set of equipotential lines, and having located the receiving antenna on a line, the user can then cause the first antenna to turn off and the second antenna, located at 90° to turn on. From the orthogonal field information, the user can now locate the receiving antenna on an orthogonal equipotential line. The two-dimensional location of the receiving antenna is revealed by the intersection of the two equipotential lines. Of course it would also be possible to simply rotate a single transmitting antenna, activating it sequentially in two orientations. The invention of course is not limited to use in orthogonal coordinates. For many applications, however, orthogonal coordinates provide required accuracy with the greatest speed and resolution.

The novel antenna apparatus comprises a voltage divider to which is coupled to conducting finger elements. Each finger element has the electric potential of the voltage divider at the point where they are electrically coupled. If a radio frequency signal is applied to the voltage divider, the finger elements will radiate a field that is constant (at any given point in time) along the fingers but which has a gradient across the fingers. The gradient is a reflection of the gradient along the voltage divider. Thus if the finger elements are parallel and straight, a series of equipotential lines parallel to, say, a Y coordinate can be generated. Orienting this antenna at 90°, or using a second similar antenna oriented at 90°, will provide a set of equipotential lines parallel to, say, the X coordinate. Each antenna, so designed, will locate a receiving antenna in one dimension. The invention is not limited to rectilinear coordinate systems. It works equally well in spherical or other coordinate systems.

In one embodiment of a two dimensional location device, the antenna apparatus of the present invention comprises a first and second antenna separated by an insulator, the first antenna including a plurality of first conductive fingers coupled to a plurality of voltage taps of a first voltage divider, wherein the first conductive fingers are spaced apart from each other and the voltage of each of the first conductive fingers is a preselected fraction of the total voltage applied between a first input voltage contact and a second input voltage contact of the first voltage divider; the second antenna including a plurality of second conductive fingers coupled to a plurality of second voltage taps of a second voltage divider, wherein the voltage of each second set of conductive fingers is a preselected fraction of the total voltage applied between a first input voltage contact and a second input voltage contact of the second voltage divider; wherein the first and the second antenna are electrically isolated from each other and wherein the fingers of the first and the second antenna are non-parallel in a detection region of the substrate; whereby the first antenna and the second antenna may be used to generate intersecting equipotential lines in the detection region. In a preferred embodiment the voltage divider is a resistive strip having the transmitting fingers coupled along the edge of the resistive strip.

One object of the present invention is to provide an antenna apparatus for electrographic system with improved control of the equipotential contours. A specific object is to reduce curvature, improve linearity and improve orthogonality of the equipotential contours. In a preferred embodiment, the fingers of the first antenna are oriented in localized regions in a direction generally orthogonal to the fingers of the second antenna.

Another object of the present invention is to provide an antenna apparatus in which the voltage of each finger may be calibrated. In a preferred embodiment additional calibration elements are included to permit the relative resistance of each segment of the voltage divider to be adjusted to compensate for processing variations in the resistivity and thickness of the resistors.

Still another object of the present invention is to provide a method of fabricating the antenna apparatus as a planar unit and then molding the antenna into a three-dimensional shape. In one embodiment, the antenna apparatus is formed as a planar unit and then molded into a hemispherical shape.

Still yet another object of the present invention is the use of the antenna apparatus as part of an electrographic position detection system.

DETAILED DESCRIPTION OF THE INVENTION

The present invention generally comprises an electrographic position sensing system, including antenna apparatus for an electrographic position location system, a method of fabricating the antenna apparatus, and the use of the antenna apparatus in an electrographic position location system. As used in this application, an electrographic location detection system is a system in which an antenna system generates a radiating electric field which may be detected a short distance proximate to the antenna surface by a stylus containing a receiving antenna element. Consequently, as used in this application, an electrographic location position system may detect the position of a stylus brought within a preselected distance from the active surface.

For detection systems similar to those shown in FIGS. 1–4 in which the equipotential lines are generated by radio frequency (rf) drive signals, for example a frequency of about 60 kHz, the equipotential lines will have an instantaneous potential that is time-varying with the same time dependency as the rf input signal. The range of frequencies that can be used varies widely, with no theoretical limit. The practical limits to the range of frequencies that can be used depend on the constraints of any particular application of the technology. The electric fields generated by the time changing potentials may be calculated using well-known laws of electromagnetism, i.e., the electric field is the gradient of the voltage potential. Consequently, maps of the equipotential lines may be calculated and used to interpret the detected signal strength proximate the radiating antenna system associated with an active surface.

Figure 1:
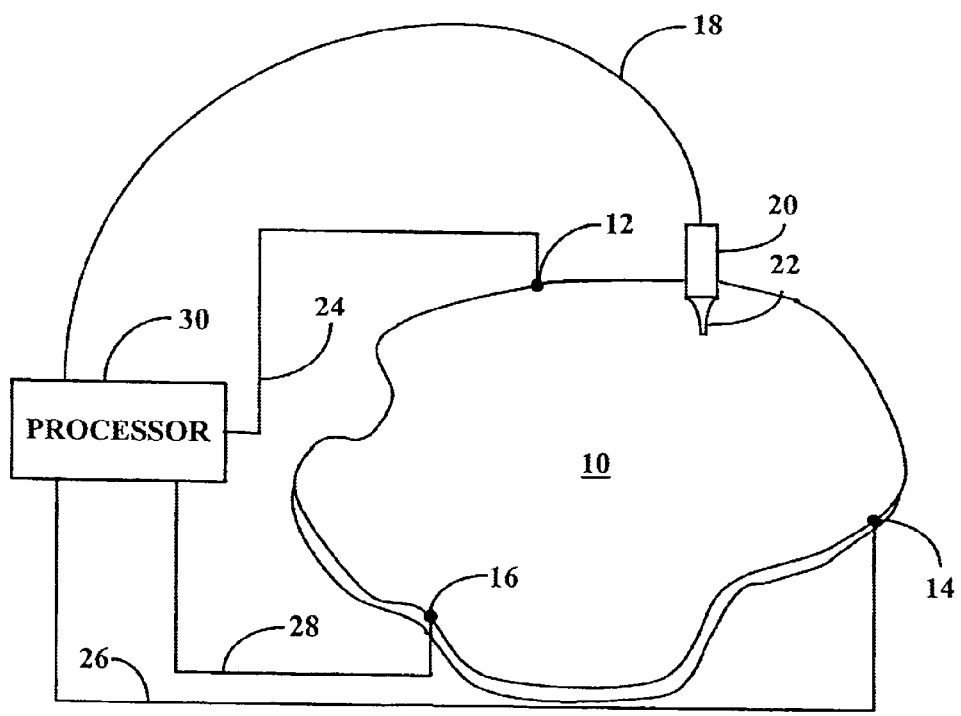
FIG. 1 is a prior art drawing of an electrographic position sensing system for determining the position of a stylus.
Figure 2:
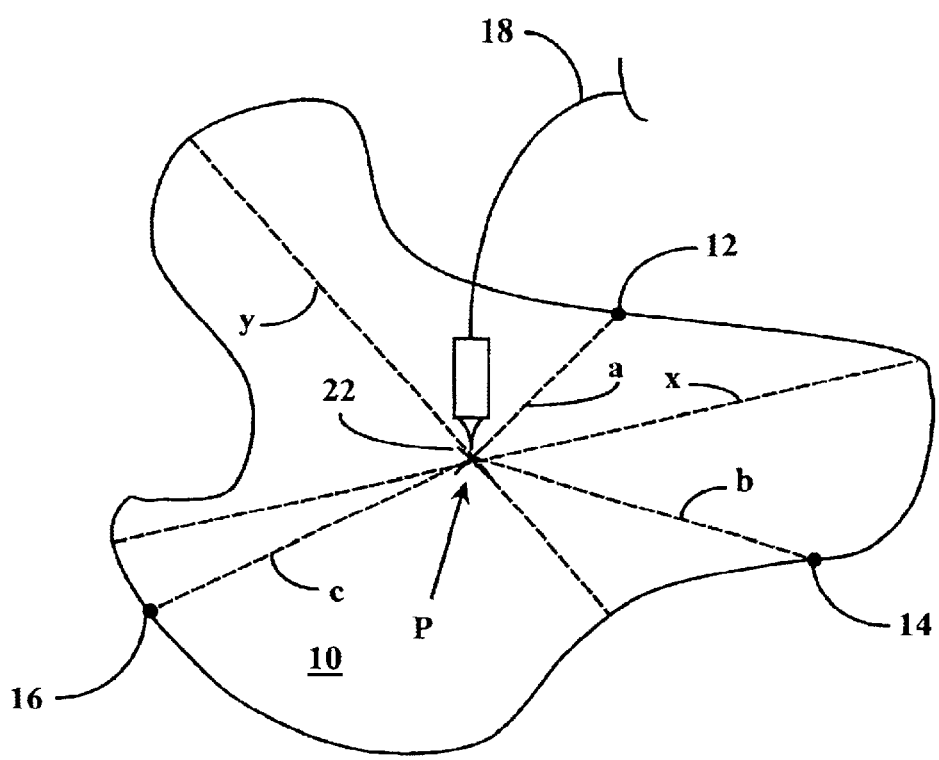
FIG. 2 is a prior art drawing illustrating the method to determine the position of the stylus of FIG. 1.
Figure 3:
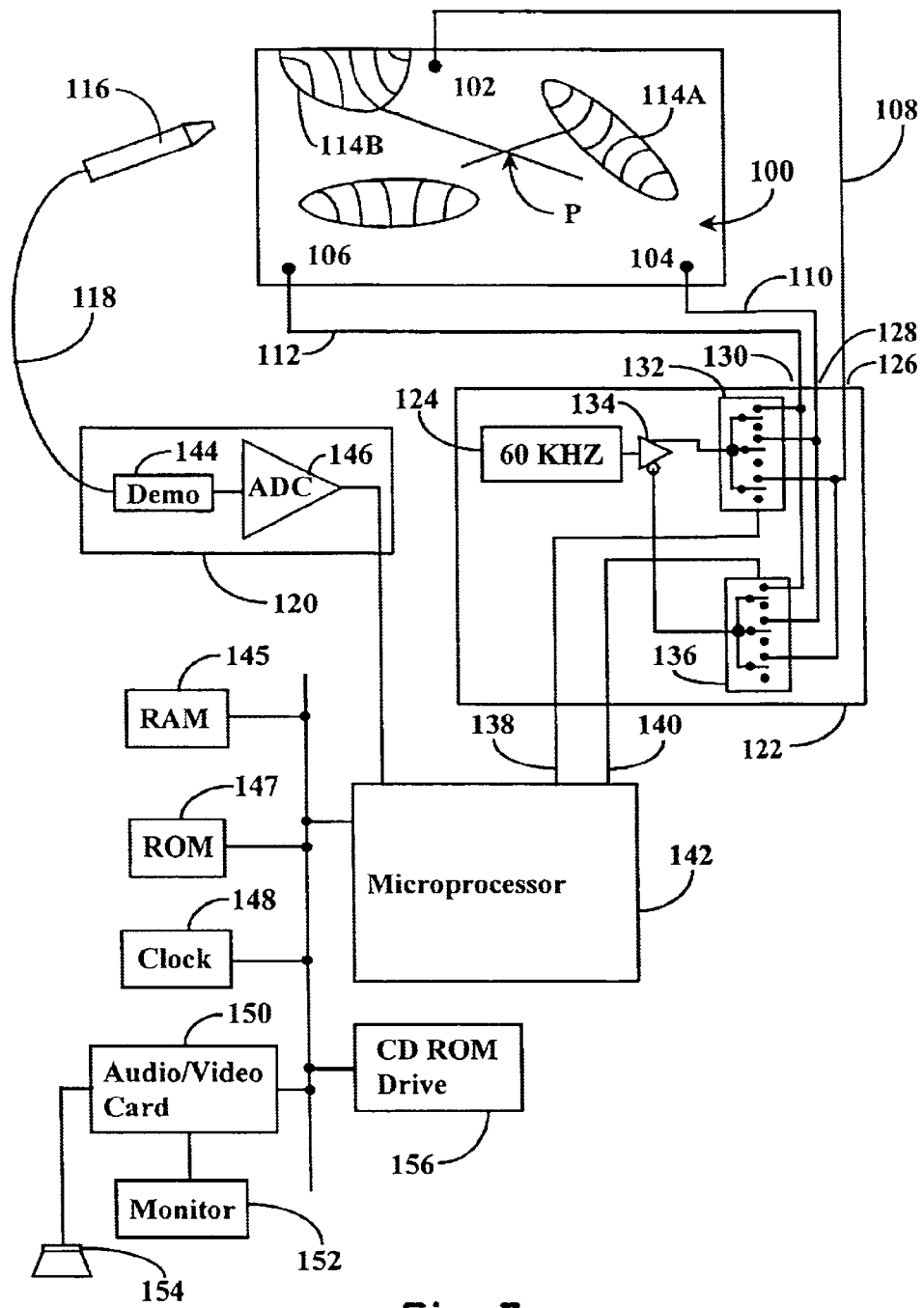
FIG. 3 is a prior art block diagram of the system of FIG. 1.
Figure 4:
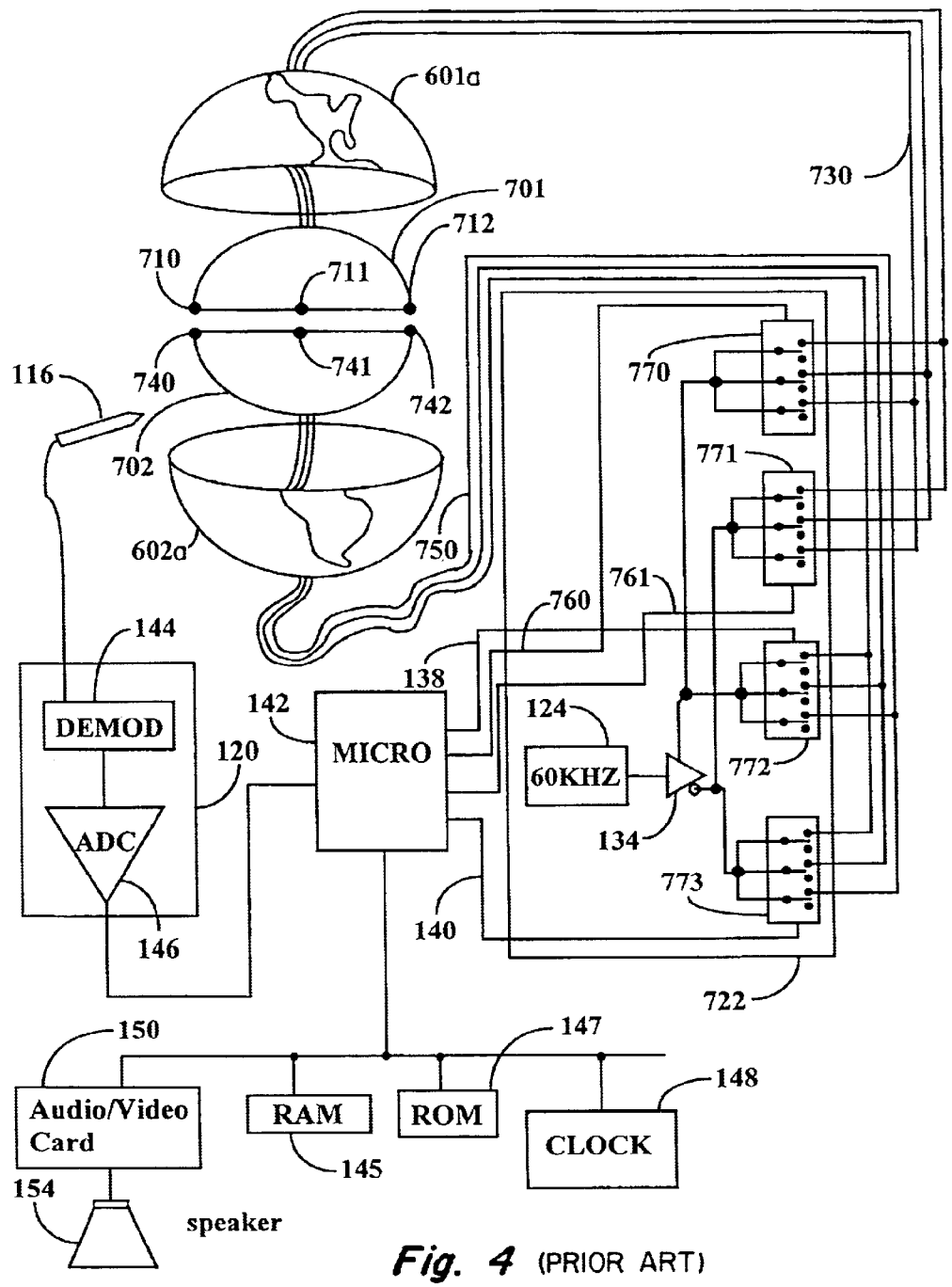
FIG. 4 is a prior art block diagram of an electrographic position sensing system for use in determining the position of a stylus relative to the surface of a globe.
Figure 5A:
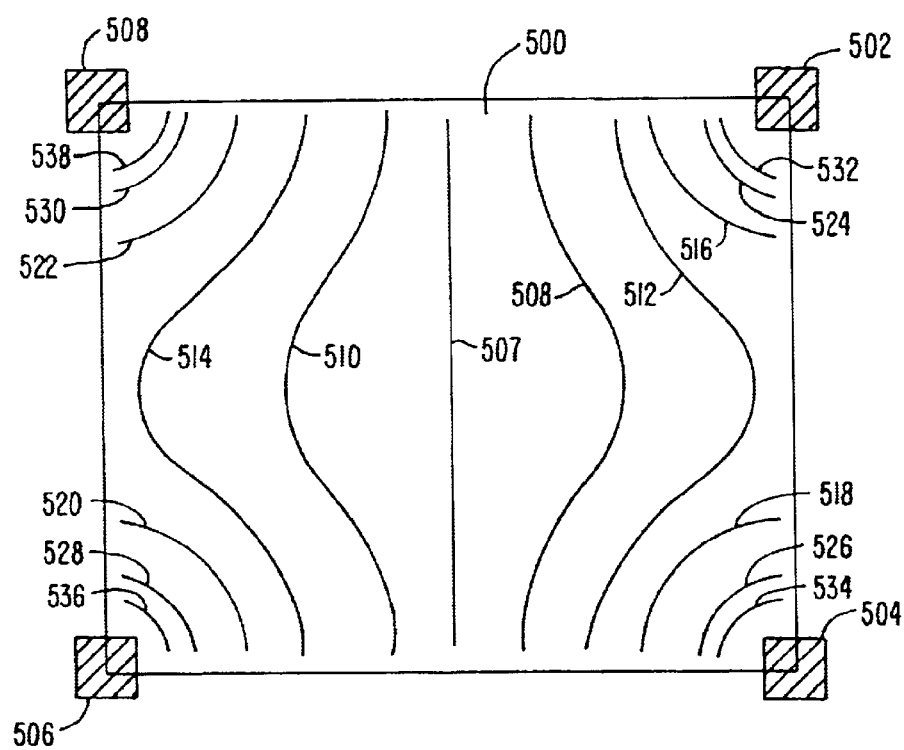
FIG. 5A shows illustrative equipotential lines for a prior art resistive layer with two contacts energized.
Figure 5B:
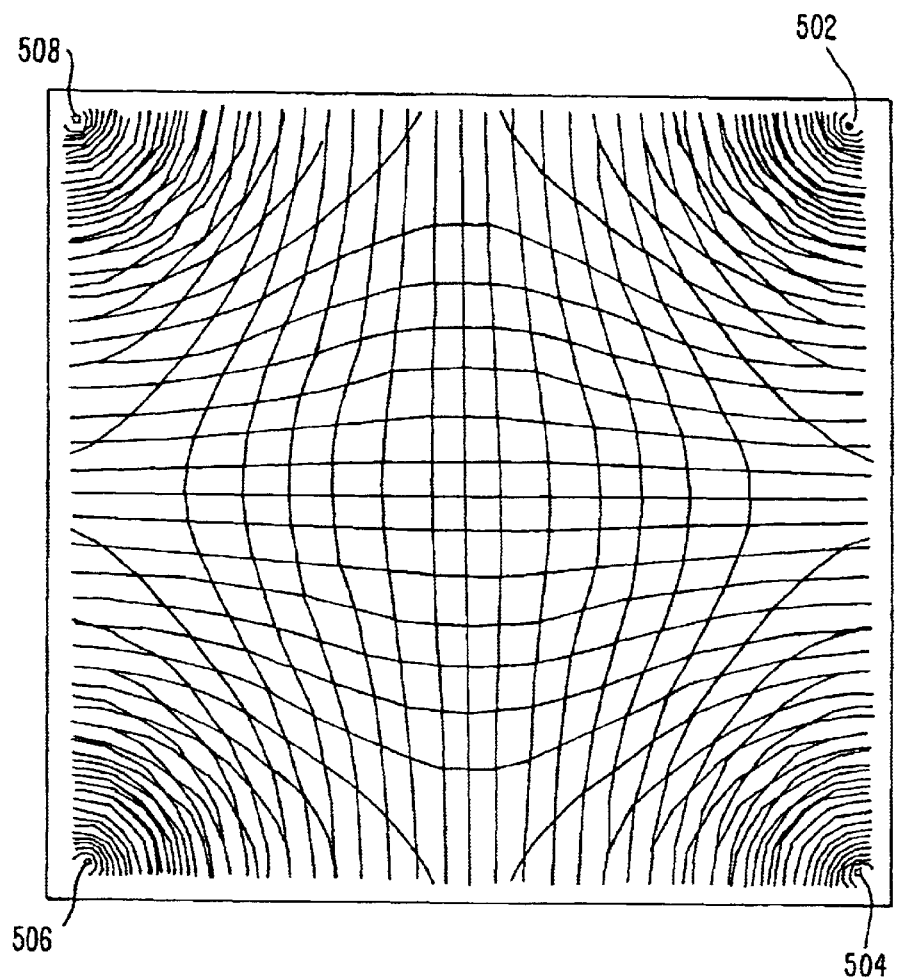
FIG. 5B is a prior art diagram showing superimposed equipotential lines for a resistive layer similar to FIG. 5A with alternate sets of contacts energized.

FIGS. 5A and 5B show the complex set of equipotential lines generated by the prior art, solid resistive sheet. FIG. 5A is a top view illustrating the equipotential signal lines for a conventional resistive surface 500 with corner contacts 502, 504, 506, and 508. For the purposes of illustration, it is assumed that sheet 500 has a constant resistivity throughout the entire surface. Mathematical equations may be used to calculate the equipotential lines when a particular set of contacts is energized. Because the current is injected from corner contacts the equipotential lines assume a non-linear shape throughout most of sheet 500. Generally speaking, current injected from a particular set of contacts will spread throughout the sheet and the potential at any given point may be calculated using well-known equations. When two contacts, such as contacts 502 and 504 are driven by an rf source, resistive surface 500 radiates a signal above the surface of surface 500. The contours of the field lines 500 can be calculated from mathematical equations. Generally speaking a contour line 507 close to the center of surface 500 will be comparatively linear. Contour lines disposed further away from the center, such as lines 508 and 510, will be significantly non-linear. Substantial non-linearity of the equipotential contour lines occurs close to the corners, as indicated by lines 510, 512, 514, 516, 520, 522, 524, 528, 530, 532, 534, and 536. Note that an orthogonal pair of contacts, such as contact 506 and 504 may also be driven. By alternating the sequence of contacts which are activated, both horizontal and vertical equipotential lines may be generated. FIG. 5B is a prior art plot of the two sets of super-imposed equipotential lines for the case that contacts 502–504 and 504–506 are sequentially pulsed as part of a multi-state drive sequence. It can be seen that in the center of resistive layer 500 the super-imposed equipotential lines approximate a grid-like pattern with orthogonal cells. Because the equipotential lines in the center of surface 500 are approximately orthogonal but become approximately parallel toward corners, the position determination is worse at the corners than at the center. Additionally, the complexity of calculation is high because of the equipotential lines have complex curves and are non-linear in their distribution. This leads to costly and slow electronics.

Additionally solid two-dimensional surfaces that depend on uniform resistance, must have their variations in resistance compensated with complex two-dimensional algorithms. This results in costly and slow electronics.

The novel antenna apparatus comprises a voltage divider to which is coupled to conducting finger elements. Each finger element has the electric potential of the voltage divider at the point where they are electrically coupled. If a radio frequency signal is applied to the voltage divider, the finger elements will radiate a field that is constant (at any given point in time) along the fingers but which has a gradient across the fingers. The gradient is a reflection of the gradient along the voltage divider. Thus if the finger elements are parallel and straight, a series of equipotential lines parallel to, say, a Y coordinate can be generated. Orienting this antenna at 90°, or using a second similar antenna oriented at 90°, will provide a set of equipotential lines parallel to, say, the X coordinate. Because the novel antenna has open spaces between the finger elements, two antennas can be conveniently stacked. When the top antenna is turned off, the antenna on the bottom can radiate upwards through the open areas in the top antenna. To prevent electrical shorting, an insulator is placed between the antennas.

Each inventive transmitting antenna will locate, in one dimension, a receiving antenna that is placed over it. That is, if the receiving antenna senses a signal of a particular strength, it can be located over or between the finger elements transmitting at that potential.

The area over the transmitting antenna where a receiving antenna can be sensed can be termed the "active area". Since one transmitting antenna locates the receiving antenna in one dimension, the there is a "1-D active area" over the finger elements of one transmitting antenna, and a "2-D active area" over the area where two antennas are stacked, that is the space above stacked antennas into which both transmitting antennas radiate. If two antennas partially overlap, they may have some regions over them that are 1-D active areas and some regions that are 2-D active areas.

The invention is not limited to rectilinear coordinate systems. It works equally well in spherical or other coordinate systems. It is also not limited to one and two dimensional sensing.

Figure 6A:
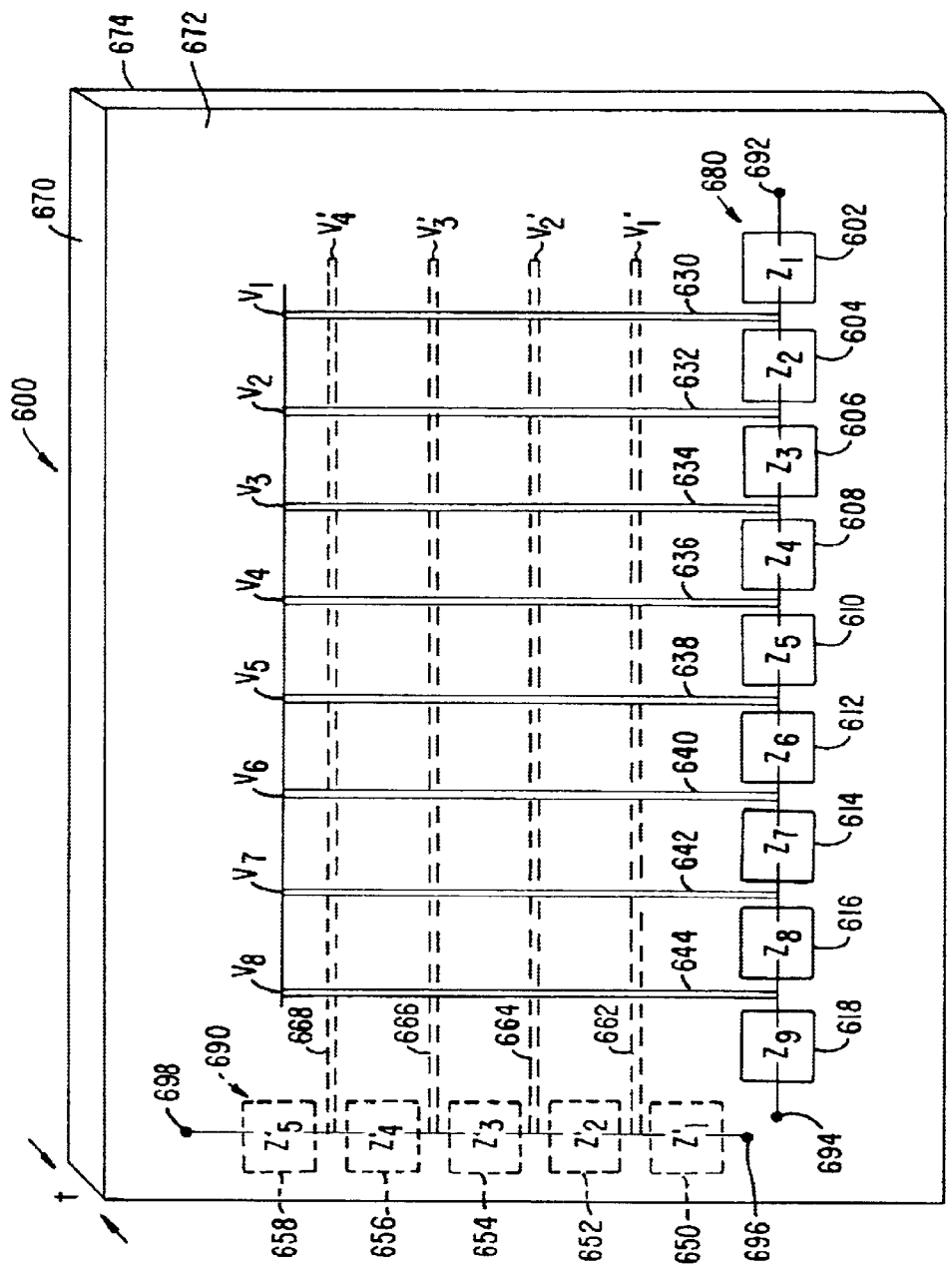
FIG. 6A is a first embodiment of the apparatus of the antenna apparatus of the present invention having impedance elements arranged as a voltage divider to control the voltage of radiative fingers.

FIG. 6A is a top view of a preferred embodiment of the active surface of the present invention comprising two antennas for generating two different sets of equipotential lines. An electrically insulating substrate 670, such as a layer of insulating paper, plastic, fiberglass or Mylar, is used as a support structure. In a preferred embodiment substrate 670 has a uniform thickness, t. On a first side 672 of substrate 670 is disposed a first antenna 680. A second antenna 690, shown in phantom, is spaced apart from first antenna 690 and separated by a sufficient thickness of insulating material to electrically isolate it from first antenna 680. In a preferred embodiment, second antenna 690 is disposed on a second side 674 of substrate 670. The two antennas are configured so that each antenna can be driven independently of the other antenna. First antenna 680 has drive terminals 692 and 694 for applying an rf voltage to first antenna 680. Second antenna 690 has drive terminals 696 and 698 for applying an rf voltage to second antenna 690.

For the purposes of illustrating the principles of the present invention, a small number of radiative finger elements are shown, although it will be understood that an arbitrary number of finger elements may be used. Referring to first antenna 680, an impedance voltage divider is formed by the impedances of elements 602, 604, 606, 608, 610, 612, 614, 616, and 618. The voltage between each impedance element is a fraction of the total rf drive voltage between terminals 692 and 694, and may be calculated using well known voltage divider rules. First antenna 680 has low resistance, conductive, finger elements 630, 632, 634, 636, 638, 640, 642, and 644. Element 630 is coupled to a node between impedance elements 602 and 604; element 632 is coupled to a node between impedance elements 604 and 606; element 634 is coupled to a node between impedance element 606 and 608; element 636 is coupled to a node between impudence elements 608 and 610; element 638 is coupled to a node between impedance elements 610 and 612; element 640 is coupled to a node between impedance elements 612 and 614; element 642 is coupled to a node between impedance elements 614 and 616, and element 644 is coupled to a node between impedance elements 616 and 618. The voltage of each finger element is uniquely determined by the location at which it couples to the voltage divider. Consequently, each conductive finger element radiates a field having magnitude that is a function of the voltage at the node where the element couples to the voltage divider. As shown in FIG. 6A, finger 630 has a voltage V1, finger 632 a voltage V2, finger 634 a voltage V3, finger 636 a voltage V4, finger 638 a voltage V5, finger 640 a voltage V6, finger 642 a voltage V7, and finger 644 a voltage V8. Note that in the preferred embodiment that the fingers are substantially parallel over a localized region. Consequently, the potential between finger elements will tend to vary approximately linearly with distance between two fingers. The assembly of finger elements thus radiate a spatially continuous set of equipotential lines, the radiated equipotential lines being substantially parallel to the finger elements. The term equipotential line relates to a line having a constant signal amplitude along the line. Other constant magnitude parameters, such as phase, may be used to achieve the same results. Examples herein are based on signal amplitude but the invention is not so limited.

Second antenna 690, which is disposed on the opposed side of substrate 670, has a second voltage divider comprised of second set of impedance elements 650, 652, 654, 656, 30 and 658. The voltage at the node between each impedance element may be calculated to be a fraction of the total voltage applied between terminals 696 and 698 using well known voltage divider rules. Conductive finger elements 662, 664, 666, and 668 are each coupled to a respective node between the second set of impedance elements, thereby establishing a voltage on each finger element. As shown in FIG. 6A, finger element 662 is an equipotential surface having a voltage V1', finger element 664 is an equipotential surface having a voltage V2', finger element 666 is an equipotential surface having a voltage V3', and finger element 668 is an equipotential surface having a voltage V4'.

Importantly, because this is an rf system with each finger element acting as an rf antenna, the broadcast through the air creates a continuous or smooth rf field resulting in higher resolution in field strength measurement than would be possible by measuring the discreet voltages generated by each element. The continuous set of field strength values between the elements enables high resolution position measurements to be made. Additionally, each finger element transmits a field that is directly related to the voltage at the point where the finger couples to the voltage divider. Thus the net effect of all the fingers creates a single field which field potential distribution reflects the voltage distribution along the voltage divider.

Therefore, the voltage divider design, that is, the voltage drop along the voltage divider, controls the potential distribution of the two-dimensional field broadcast by the antenna finger elements. The structure of voltage divider and associated finger element antennas can be used to create a two-dimensional potential field distribution that is linear and straight.

A line of position in the two-dimensional field can be determined by measuring the potential and because the potential distribution is easily made linear and straight the required electronics and algorithms are simplified.

By using two such antennas, each comprised of a voltage divider and finger elements, it is possible to create two separately generated fields. If the antennas are positioned relative to one another such that, (i) their finger element areas overlap, (ii) the finger elements of one antenna are orthogonal to the finger elements of the other antenna, and (iii) the finger elements of the top antenna do not significantly block signals from the finger elements of the bottom antenna, then two orthogonal, two-dimensional, potential distributions, each of which is linear and straight, can be generated.

Therefore a point of position in the two two-dimensional fields can be determined by measuring the potential detected from each antenna. Of course, the two antennas and the fields they broadcast need not be linear, straight, or orthogonal. Having them so simplifies the electronics and algorithms.

It is an important benefit of this design that each of the two two-dimensional potential field distributions can be controlled independently by adjusting the one dimensional voltage distribution along the voltage divider associated with each antenna. The antenna system has an important benefit because variation in resistivity that occurs during manufacture of the voltage divider can be compensated algorithmically, by using two independent one-dimensional algorithms. This significantly simplifies the electronics and algorithms compared to the two-dimensional approach the prior art requires.

Figure 6B:
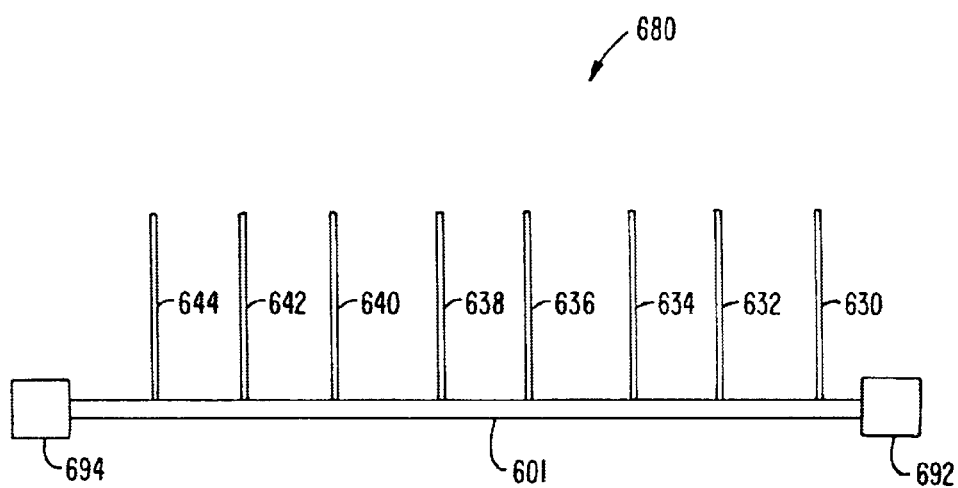
FIG. 6B shows a variation of the antenna apparatus of FIG. 6A in which the impedance voltage divider comprises a continuous strip of a resistive material.

While the voltage dividers may be fabricated as a series of discrete resistors coupled end-to-end, a preferred method of fabrication is to fabricate the voltage divider as a resistive strip 601, as shown in FIG. 6B. The resistive strip may be fabricated with a constant resistance per unit length. Alternately, the resistive strip 601 may have a variable resistance per unit length. The relative voltage at a particular node where a finger element, such as element 632, is coupled to resistive strip 601, may be calculated using well known voltage divider equations.

Figure 7:
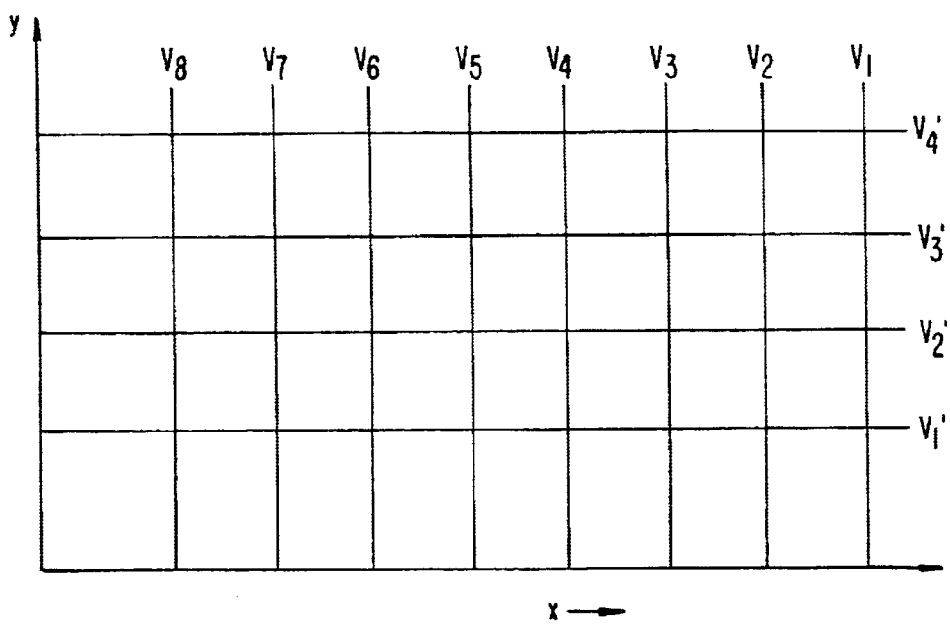
FIG. 7 is an illustrative plot of the superimposed equipotential lines of the antenna apparatus of FIG. 6A.

As shown in FIG. 7, the finger elements of each antenna 680, 690 form well-defined equipotential lines. Consequently, the equipotential lines of the two antennas can be designed to be substantially orthogonal to each other as well as linear and straight. This facilitates position detection. The two antennas 680 and 690 of antenna system 600 are preferably sequentially pulsed at different times according to a multi-state drive method described below in more detail. As shown in FIG. 7, a point, P, may have several unique potentials associated with each of several unique drive sequences. For example: the potential with both antennas off, the potential with both antennas on, the potential with only the first antenna on, and the potential with only the second antenna on.

For a pair of antennas wherein each has a resistive strip type voltage divider, and the voltage divider has finger elements coupled to it between at least two electrical contacts, a Five State Drive Algorithm is preferably used to determine the position of a detector, i.e. a receiving antenna, over the pair of transmitting, or broadcasting, antennas. The algorithm is comprised of sequencing through five states, then manipulating the measurements made at each state to obtain the location of the device that detected the field strength measurements. Typically that device is a stylus that contains an rf receiving antenna. In many embodiments, a stylus is used to point to a region overlying the transmitting antenna pair and the receiving antenna in the stylus detects the magnitude of the electric field strength. The detected signals are transmitted to a microprocessor. The five states that are measured by the receiving antenna are:

1. no voltage is applied to either antenna;
2. a gradient voltage is applied to the voltage divider of only the top antenna,
3. a constant voltage is applied to the voltage divider of only the top antenna;
4. a gradient voltage is applied to the voltage divider of only the bottom antenna; and
5. a constant voltage is applied to the voltage divider of only the bottom antenna.

Following this sequence, first the potential measured by the stylus during state I is subtracted from each of the other four measurements to remove any DC error component. After the subtraction, there are four measured field potential values: $P_{Top-G}$; $P_{Top-C}$; $P_{Bottom-G}$; and $P_{Bottom-C}$, respectively, where "G" refers to application of a gradiant voltage to the voltage divider and "C" refers to application of a constant voltage to the voltage divider. Second, to remove any variation attributable to the receiving antenna possibly being at different heights with respect to the underlying broadcasting antenna pair, each gradient measurement is normalized to the constant voltage measurement for both the top and bottom antenna. Thus for the top antenna a value is obtained for the ratio $P_{Top-G}/P_{Top-C}=P_{Top}$ and for the bottom antenna a value is obtained for the ratio $P_{Bottom-G}/gP_{Bottom-C}=P_{Bottom}$. When these ratios are obtained, each is compensated, if necessary, for any variance in resistance along the voltage divider (as explained elsewhere, this compensation may have been already made by physical devices inserted in the circuitry). Last, the positional meaning of each of the two values, $P_{Top}$ and $P_{Bottom}$ is determined in terms of physical co-ordinates through use of an algorithm based on the designed equipotential line distribution.

Figure 15A:
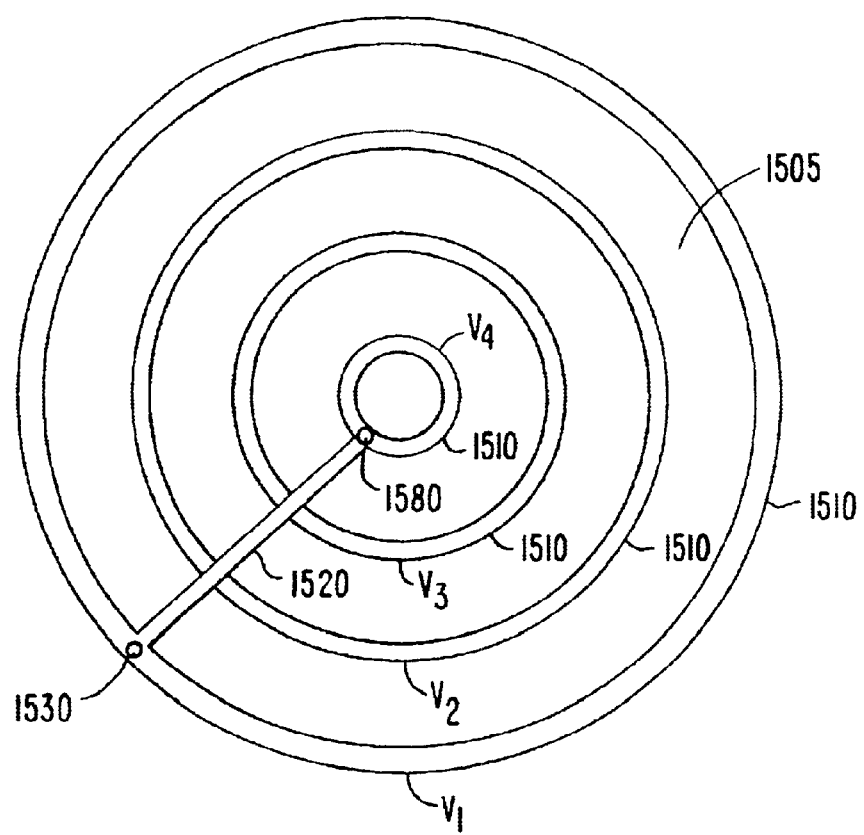
FIG. 15A shows an illustrative front view of an antenna apparatus shaped to be molded into a hemispherical shape.
Figure 15B:
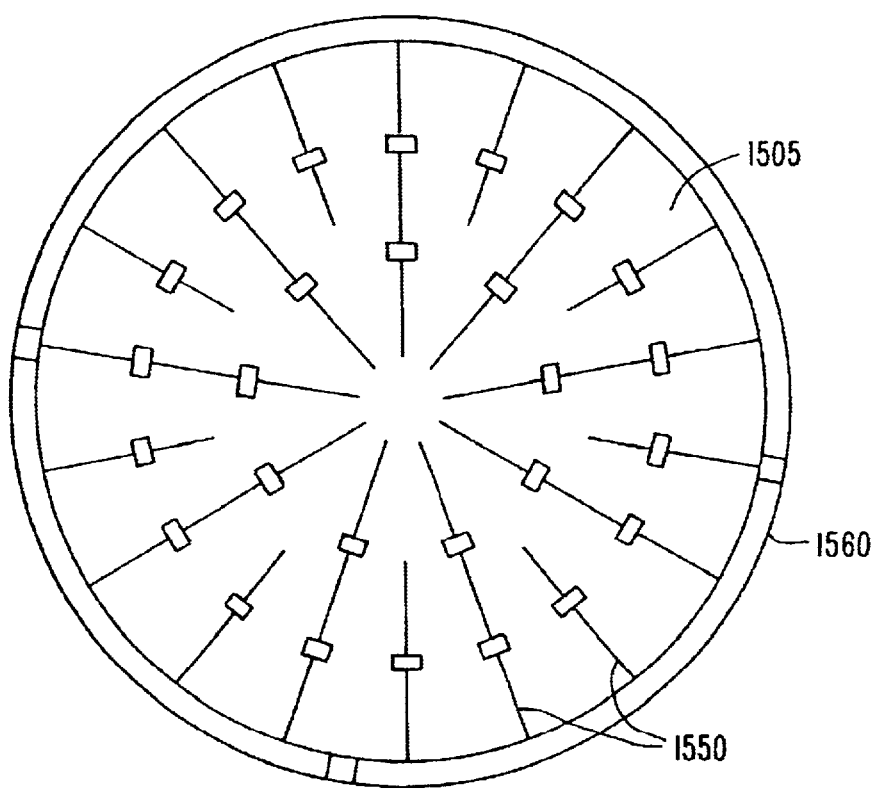
FIG. 15B shows an illustrative rear view of the antenna apparatus of FIG. 15A.

Many different antenna patterns can be used to determine the position of a detector, i.e. a receiving antenna, over the pair of transmitting, or broadcasting, antennas. In one alternate antenna configuration, the top and bottom antennas may have different geometric configurations. In one such embodiment, a first (optionally the "Top") antenna has a resistive strip voltage divider coupled to curved finger elements that loop around, say, a hemispherical surface, as shown in FIG. 15A. The loops 1510 can have a single break in them, but preferably encircle a "latitude". Specifically, loops 1510 are substantially parallel to the line of the second antenna's voltage divider 1560, shown in FIG. 15B. The second (optionally the "Bottom") antenna has a continuous resistive strip voltage divider 1560 which has no terminal ends, for example, forming a circle. The voltage divider 1560 has at least 3 electrical contacts placed at intervals along the continuous divider. The contacts can be driven with multiple drive sequences to form specific continuous fields. The bottom antenna also comprises a plurality of finger elements. They may be approximately evenly distributed throughout the detection area. This antenna pair is typically used on a hemispherical shape. Though it is not so limited, the example below will address the hemispherical example.

To determine the position of a receiving antenna located above the hemisphere a Six State Drive Algorithm is used.

1. no voltage is applied to either antenna;
2. a gradient voltage is applied only to the voltage divider 1520 of the top antenna;
3. a constant voltage is applied only to the voltage divider 1520 of the top antenna;
4. a first gradient voltage is applied only to voltage divider 1560 of the bottom antenna, by applying a voltage to two or more of the at least three contacts;
5. a second gradient voltage is applied only to voltage divider 1560 of the bottom antenna, by applying a different voltage pattern to two or more of the at least three contacts; and
6. a constant voltage is applied only to the voltage divider of the bottom antenna. Following this sequence, first the potential measured by the receiving antenna in a stylus during state 1 is subtracted from each of the other five measurements to remove any DC error component. After the subtraction, there are five measured field potential values: $P_{Top-G}$; $P_{Top-C}$; $P_{Bottom-G1}$; $P_{Bottom-G2}$; and $P_{Bottom-C}$, respectively.

Second, to remove any variation attributable to the receiving antenna possibly being at different heights with respect to the underlying broadcasting antenna pair, each gradient measurement is normalized to the constant voltage measurement for both the top and bottom antenna. Thus for the top antenna a value is obtained for the ratio $P_{Top-G}/P_{Top-C}=P_{Top}$ and for the bottom antenna a value is obtained for the two ratios $P_{Bottom-G1}/P_{Bottom-C.}=P_{Bottom1}$, and $P_{Bottom-G2}/P_{Bottom-C.}=P_{Bottm2}$. When these three ratios are obtained, each is compensated, if necessary, for any variance in resistance along the voltage divider. Last, the positional meaning of the values of $P_{Top}$, $P_{Bottom1}$, and $P_{Bottom2}$ are determined through use of an algorithm based on the designed equipotential line distribution. Two values are needed to uniquely determine the co-ordinate value of the second co-ordinate, associated with the bottom antenna, because the potential that is measured could be at either of two points on the equipotential line generated from a particular gradient drive pattern. Thus points need to be measured on equipotential lines generated from two drive configurations to obtain a unique co-ordinate point.

Figure 8:
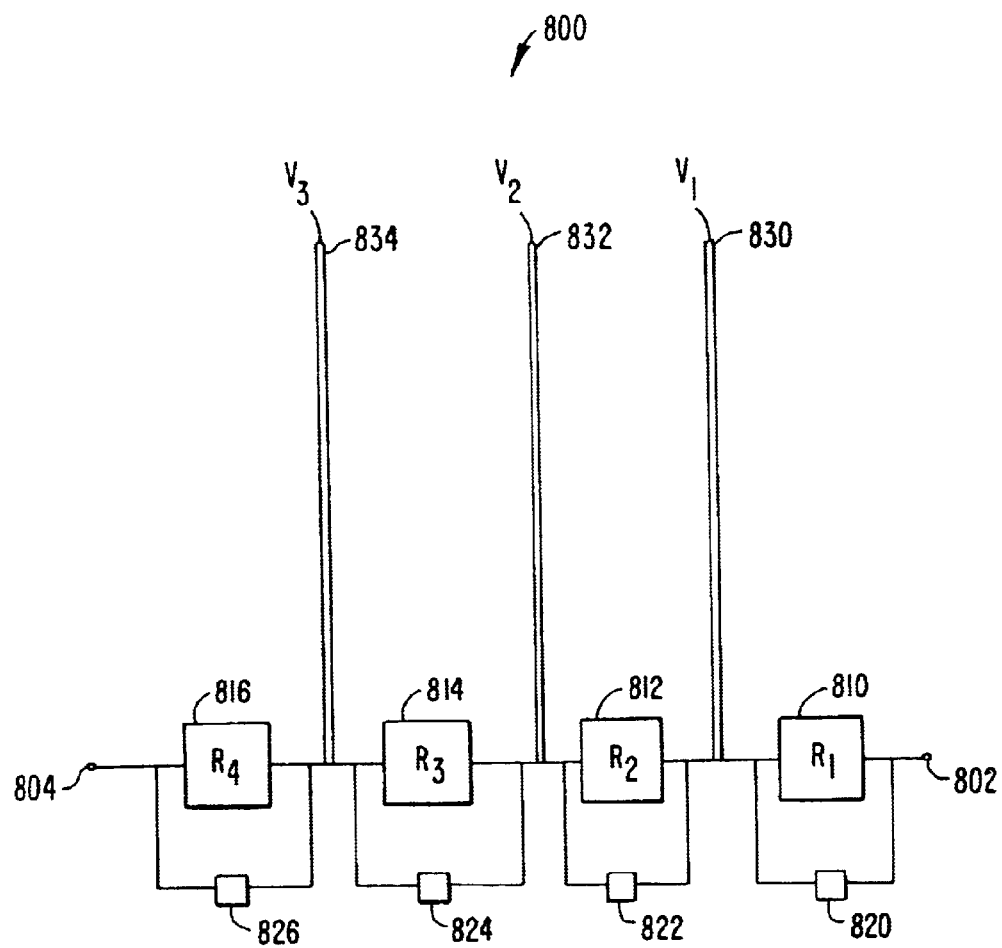
FIG. 8 shows a variation of the antenna apparatus of FIG. 6A with additional calibration elements coupled to the voltage divider to calibrate the voltage of each radiative finger.

The antenna designs of the present invention also permit the relative equipotential of each finger element to be adjusted. FIG. 8 shows an embodiment 800 of the present invention designed to permit additional control of the voltage of each element 830, 832, 834. As shown in FIG. 8, a voltage divider comprised of resistors 810, 812, 814, and 816 is coupled end-to-end. The two ends of the chain, nodes 802 and 804, are configured to be driven by an rf voltage source. Normal manufacturing variance may, however, result in each of the resistors 810, 812, 814, and 816 being 20–30% away from their nominal target values. Additional resistive tuning elements 820, 822, 824, and 826 are configured to permit each resistor to have its effective value trimmed. Resistive tuning elements 820, 822, 824, and 826 may comprise any conventional element used to trim a resistance value. For example, resistive tuning elements 820, 822, 824, and 826 may comprise a resistor that is trimmed in physical thickness by mechanical trimming or by laser trimming. Additionally, resistive tuning elements 820, 822, 824, and 826 may comprise any conventional arrangement of resistors and fuses configured to permit the effective resistance of resistive tuning elements 820, 822, 824, and 826 to be adjusted. To compensate for variation in resistivity along resistive strip 601, holes can be created or punched in the strip.

Figure 17:
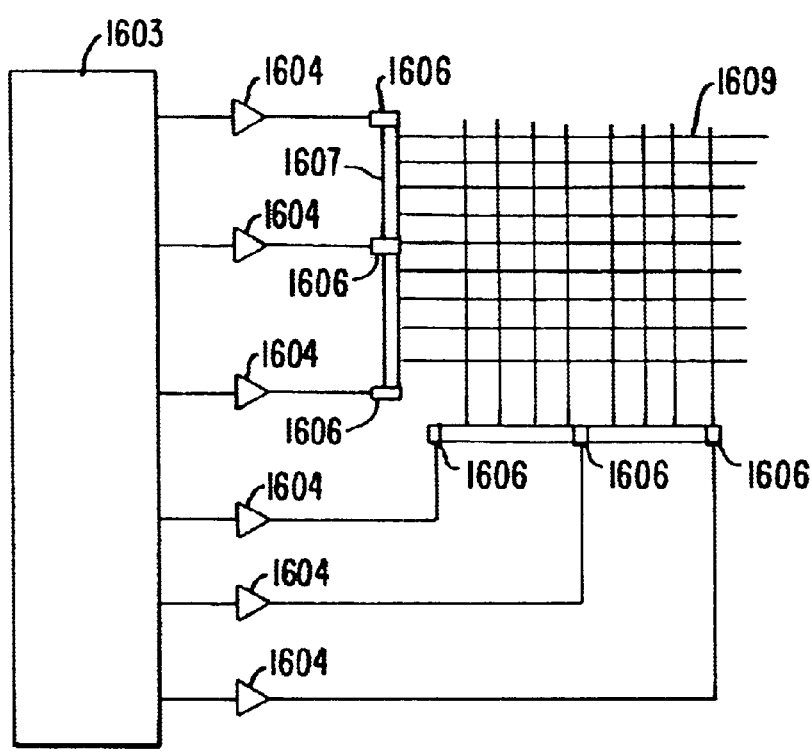
FIG. 17 is a block diagram of an embodiment of the present invention in which the voltage divider has center voltage input taps.

Yet another way to compensate for variable resistance along the voltage divider is to use one or more input voltage taps as illustrated in FIG. 17 and described in more detail below.

Figure 9:
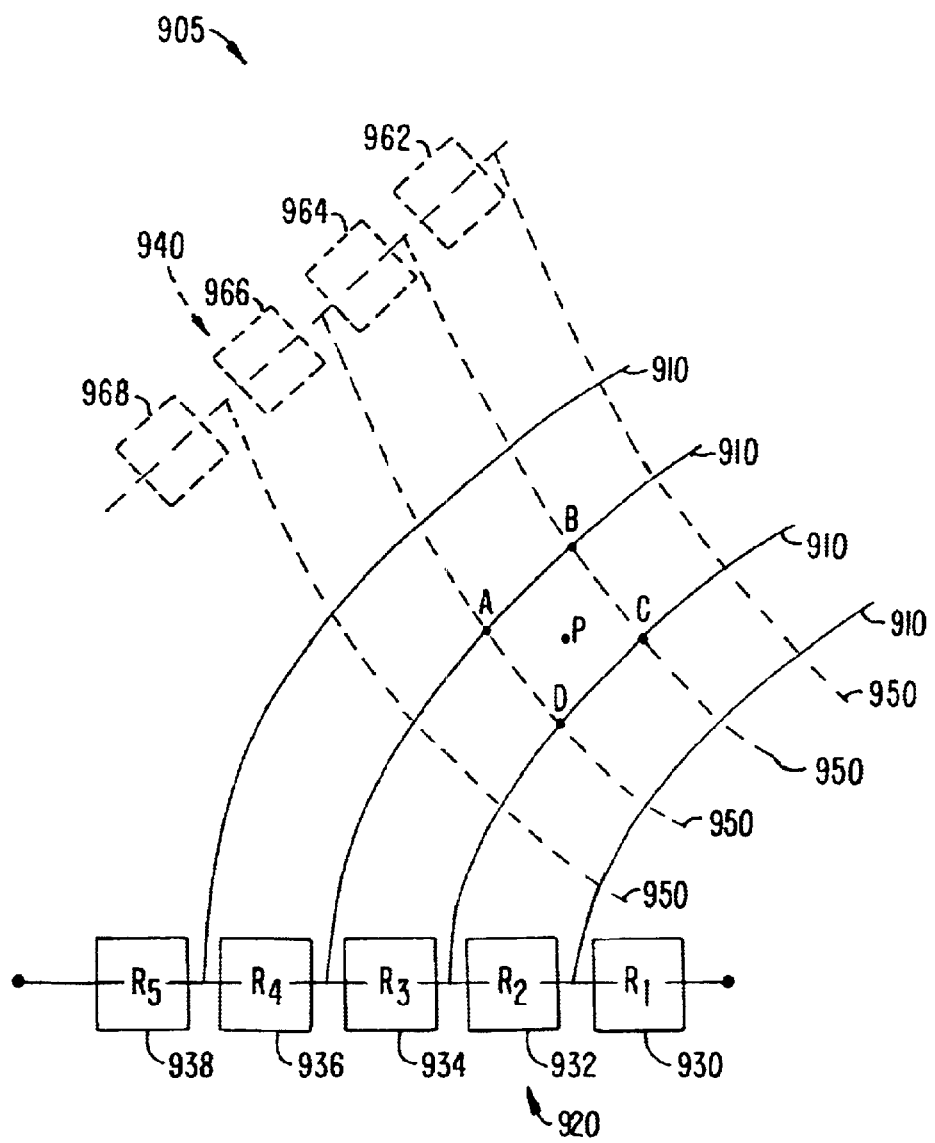
FIG. 9 shows a variation of the antenna apparatus of FIG. 6A in which the finger elements are curved over a portion of the antenna apparatus.

One of the advantages of the antenna system of the present invention is that it provides a way to control the equipotential profile of surfaces with complex shapes. It is preferable that the finger elements of two antennas 680, 690 define an orthogonal grid because this reduces the computational difficulty of calculating a position based upon measured voltages at a particular point in space. However, the present invention may be adapted for use in a variety of curved and non-planar surfaces as well. FIG. 9 shows an embodiment of the present invention in which the fingers 910 of a first antenna 920 have a first radius of curvature over a two dimensional surface 905. First antenna 920 has resistive elements 930, 932, 934, 936, and 938 coupled together as a voltage divider to determine the voltage of each finger element 910. Second antenna 940 is shown in phantom and is spaced apart from surface 905 underlying first antenna 920. Second antenna has finger elements 950 with the voltage of each of the elements determined by the node at which the element is coupled to the voltage divider, between resistors 962, 964, 966, and 968. The finger elements 950 of second antenna 940 may have a second radius of curvature. A point P located in the region ABCD formed between the finger elements of first antenna 920 and second antenna 940 has significant symmetry. Consequently, the voltages at point P will be a quasi-linear function of the separation of point P from line segments AB and DC and of the separation of point P from line segments BC and AD.

A preferred method of fabrication is to form the antennas on an insulating substrate, such as a plastic or Mylar substrate. A preferred method to fabricate resistive and conductive elements is with patterned conductive ink films. Any resistive material may be used to fabricate the resistors of a voltage divider, such as a carbon based polymer ink, or carbon based water ink. The fingers may be formed from a conductive ink or a thin layer of metal. A preferred low cost construction approach is to use high speed printing techniques to print carbon and silver inks on either Mylar or paper substrates. Silkscreen techniques work best for polymer based inks whereas flexographic and Graveur process work best for water based inks.

Figure 10A:
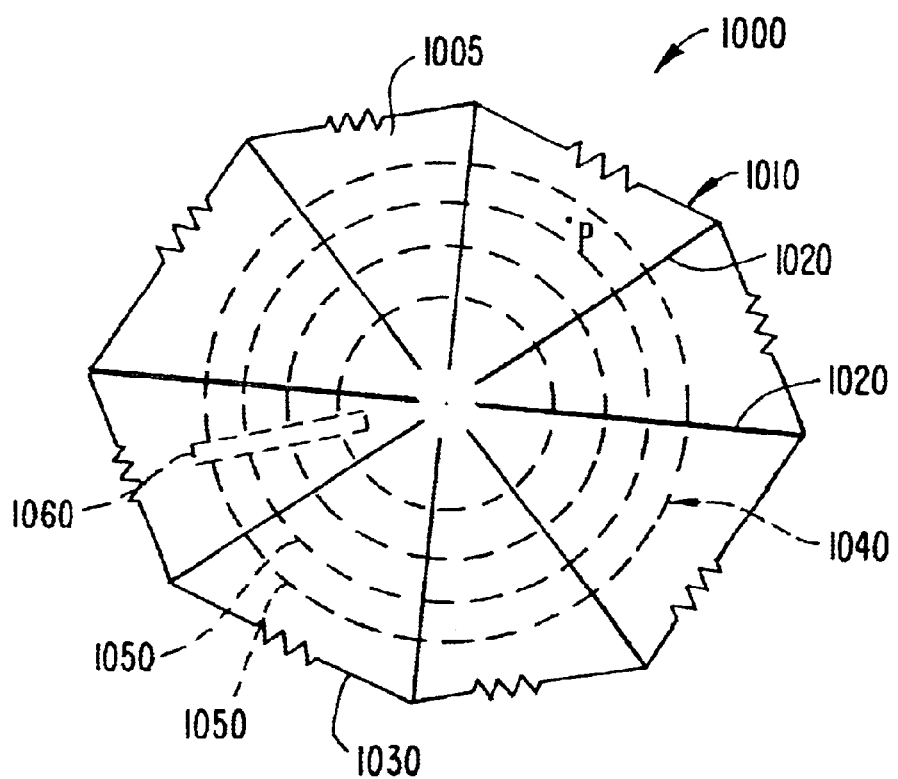
FIG. 10A shows an embodiment of the antenna apparatus of the present invention formed from a moldable substrate.
Figure 10B:
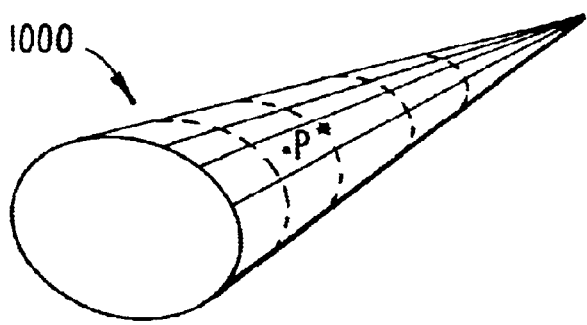
FIG. 10B shows the antenna apparatus of FIG. 10A molded into a cone shape.

The resistive and conductive layers may also be patterned on a substrate that can be formed by a vacuum molding process. In particular, the substrate may comprise a flat vinyl sheet. This permits the antenna of the present invention to be patterned as a two-dimensional planar surface and then later molded into a more complex three-dimensional shape using well known vacuum molding processes. FIG. 10 A is a top view of an antenna system 1000 formed on a moldable substrate 1005. First antenna 1010 includes a first set of finger elements 1020 disposed on a first surface of moldable substrate 1005. Each of the first set of finger elements is coupled to a different node of a first resistor divider 1030, which comprises a resistor with a preselected resistance per unit length. A second antenna 1040 is disposed on an opposed side and is shown in phantom. The finger elements of the second antenna are shown as forming loops. Each of the finger elements of second antenna 1040 are connected to a different node of a second resistor divider 1060 having a preselected resistance per unit length. Antenna system 1000 may be molded using conventional plastic and polymer molding processes, such as vacuum or pressure forming molding. For example, as shown in FIG. 10B, antenna system 1000 may be molded into a cone shape. A point P on the planar surface is translated to a point P* on the cone shaped surface of FIG. 10B. As can be seen in FIG. 10B, in a region around P* the finger elements retain local symmetry. Consequently, the equipotentials will tend to be a quasi-linear function of position relative to the grid formed by neighboring finger elements.

When a planar antenna system is formed into a complex shape the position finding problem can be broken into two elements for the purpose of retaining simplified algorithms.

The first element consists of the position finding problem that applies to the antenna pattern as it exists on the planar substrate prior to forming. The second element is to apply a translation algorithm or map that represents the physical transformation of the planar surface into the complex surface.

Figure 11:
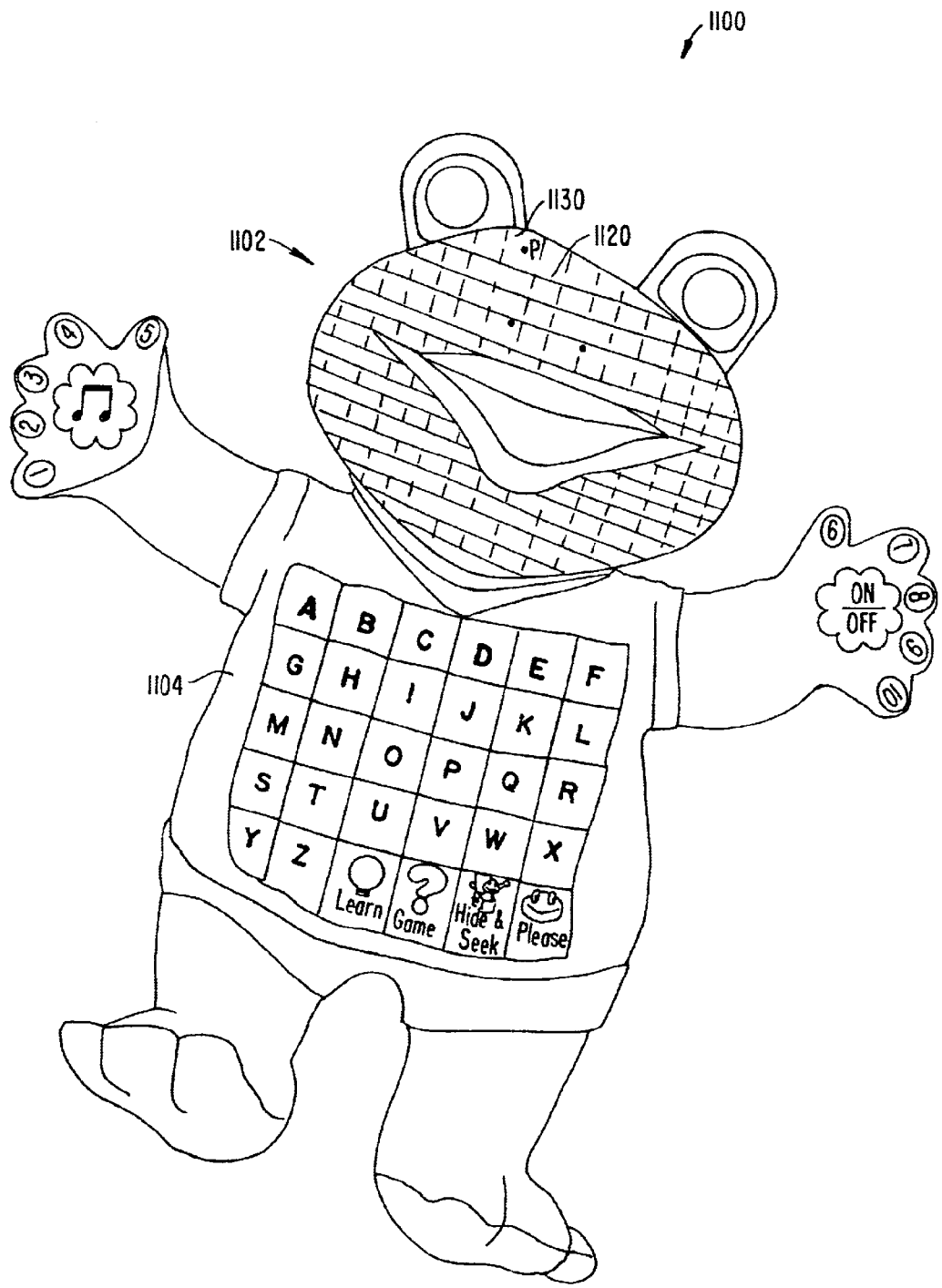
FIG. 11 shows a moldable antenna of the present invention molded into the profile of a child's toy.

The antenna system of the present invention may also be molded into a variety of shapes. As shown in FIG. 11, an antenna system 1110 may be molded into a complex surface, such as that of a portion 1102 of a child's toy 1104. First antenna 1120 and second antenna 1130 may be substantially orthogonal over localized surface regions even though the surface as a whole is highly non-planar. Consequently, the equipotential about a local point P of toy 1104 will tend to be quasi-linear functions of position with respect to neighboring finger elements.

Figure 12:
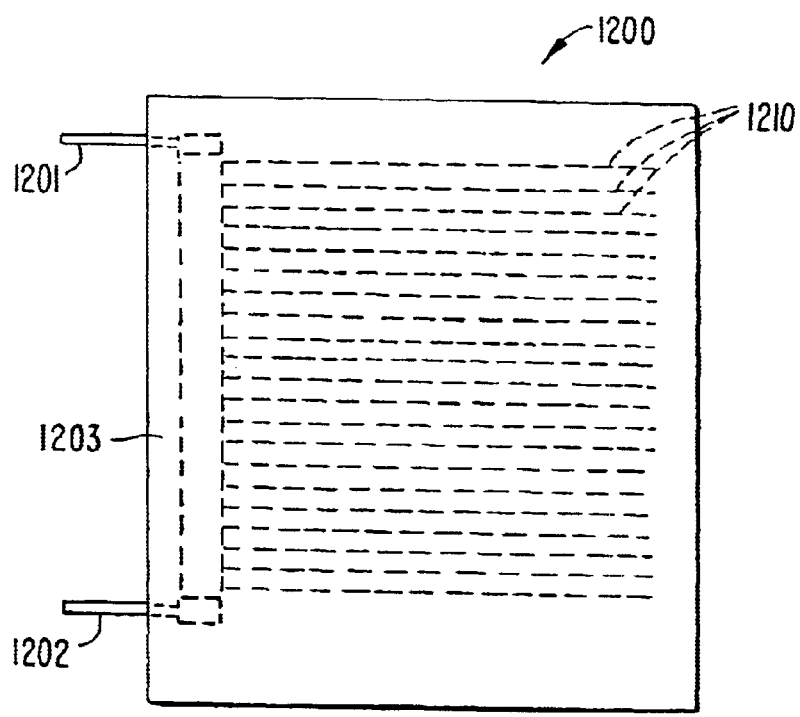
FIG. 12 is a rear view of a preferred embodiment of a planar antenna apparatus.
Figure 13:
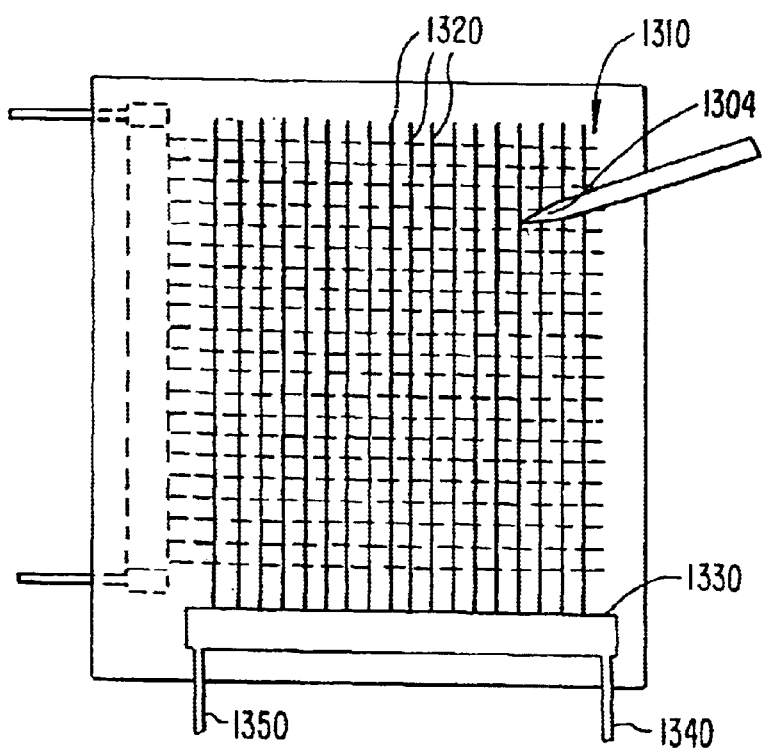
FIG. 13 is a front view of the antenna system of FIG. 12.

FIG. 12 shows a view, through a transparent insulating sheet, of a preferred embodiment of an antenna apparatus 1200 printed on the opposite side of the sheet from that viewed. In this embodiment the position of stylus relative to a planar support surface is determined. A resistive strip 1203, driven by end contacts 1201 and 1202, forms a voltage divider for driving the finger elements of second antenna 1210. FIG. 13 shows a view of the antenna apparatus of FIG. 12 having a second antenna 1310 printed on the side viewed. A stylus 1304 is shown positioned over the surface of antenna 1310. Antenna 1310 has finger elements 1320 driven by a resistive strip 1330, configured as first voltage divider between contacts 1340 and 1350.

Several factors are balanced in choosing the optimum distance, or gap, between finger elements. Generally it is desirable, on the top antenna, for the distance between finger elements to be large enough that the broadcast from the bottom antenna is not blocked by the structure of the top antenna. In addition, the wider the spacing is between the fingers, the smaller the capacitive coupling will be between the two antennas, which are optimally uncoupled. Based on these factors, it would seem desirable to design wide spaces between the finger elements. However, as the distance between the finger elements increases, their ability to broadcast a signal efficiently decreases. Furthermore, if the distance between the finger elements is widened by decreasing the finger width, the antenna resistance increases, which leads to detrimental cross coupling between the antennas. Thus choosing a distance between the finger elements involves balancing all of these factors.

Another set of factors that require balancing relate to the width of each finger element. Wide fingers tend to produce good broadcast characteristics and result in less interference from other objects, like for example, a user's hand grasping the stylus to point. But wide finger elements have the disadvantage of increasing capacitive coupling between the antennas. This is because the capacitive coupling between the two antennas is a direct function of the overlap of the fingers from each of the two antennas. If the finger widths are wider, there is more overlap area. To address this problem, finger elements were designed that were narrower at the points were fingers from two antennas would cross, and wider at other regions. This is illustrated in FIG. 14B. Fingers 1410 are located on the top antenna and, compared to the bottom antenna, have less-broad widened areas so as not to obstruct the field from the bottom antenna, which must radiate through the top antenna. Fingers 1420 are located on the bottom antenna and have relatively broader, though shorter, widened areas so that the bottom antenna can radiate effectively between the fingers of the top antenna. Of course the invention is not limited by the exact design of the variable width finger elements. Rather, the geometry is optimized for each application of the novel antennas.

It is not necessary to form the antennas on opposing sides of a single electrically insulating sheet. They may be formed on separate sheets, then sandwiched together in a configuration where the fingers of one antenna are not parallel to the fingers of the other antenna, and where the antennas are separated by one of the insulating sheets. However forming the antennas in this fashion has some disadvantages. One disadvantage is that the two sheets must be consistently aligned for consistent and error-free operation. Another is that in non-planar configurations it may be difficult to fit the two sheets immediately adjacent to one another. Variable spacing between the two antennas could result in decreased sensitivity and accuracy.

Figure 14A:
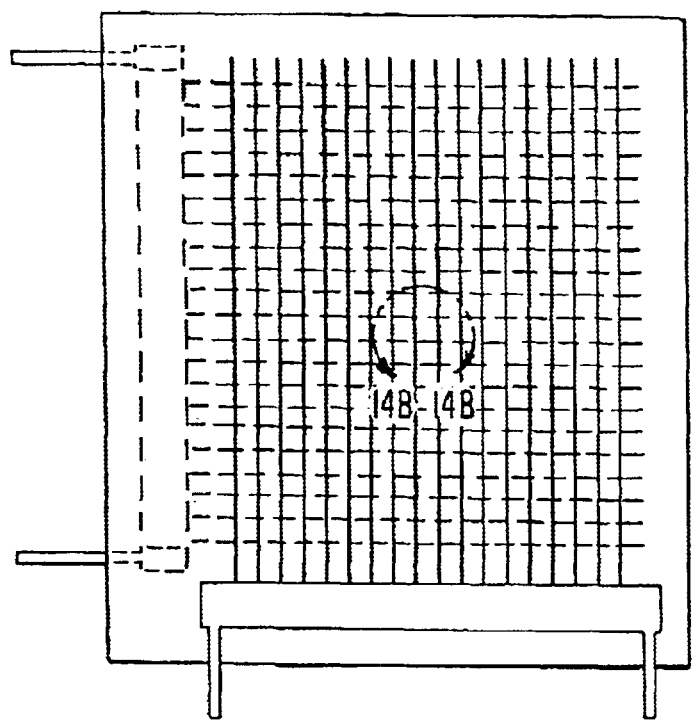
FIGS. 14A and 14B show a detail of a preferred embodiment of the antenna apparatus of FIG. 12 in which the two antennas have finger elements shaped to reduce the interaction between the two antennas.
Figure 14B:
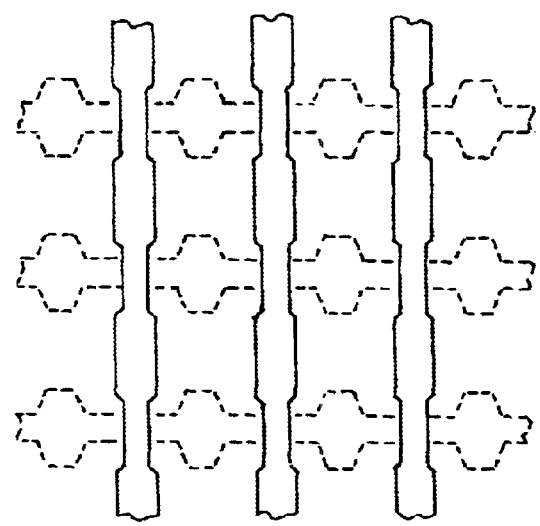
Figure 16:
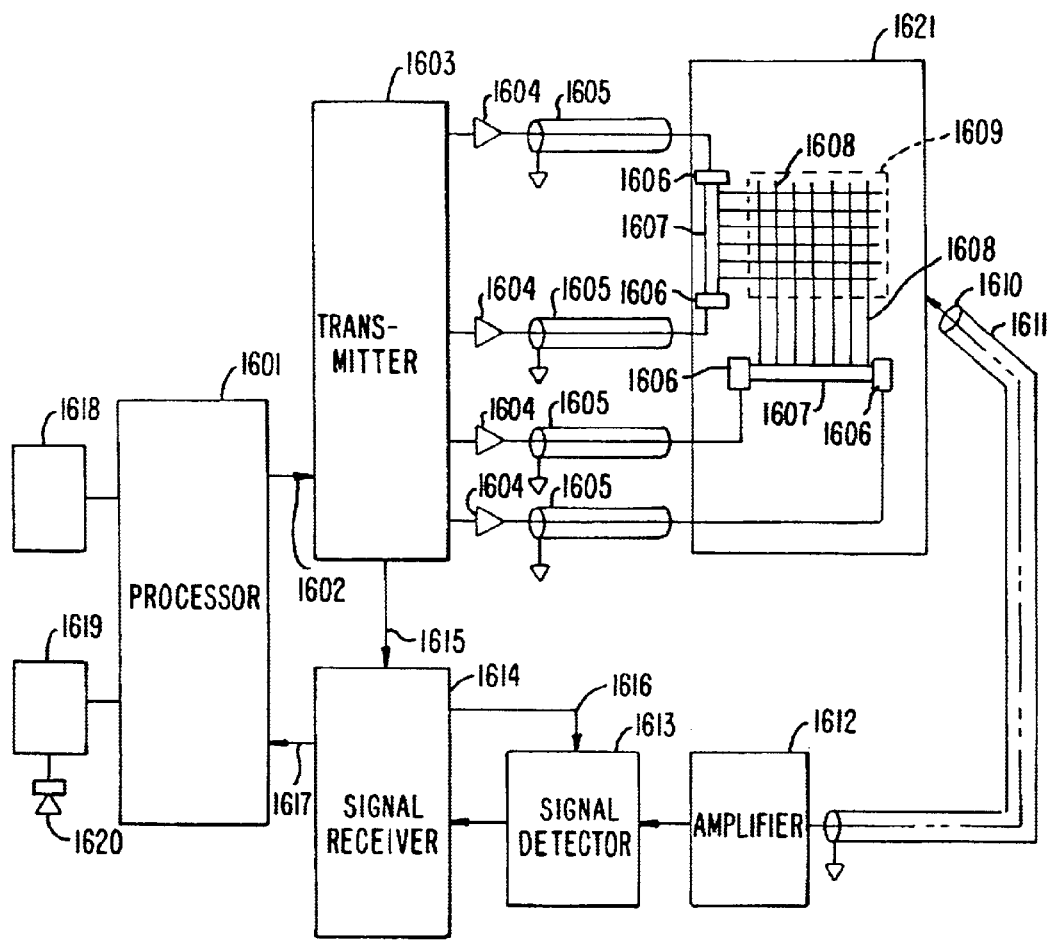
FIG. 16 is a block diagram of an electrographic position sensing system of the present invention including a planar antenna apparatus.

FIG. 16 is a block diagram of an electrographic position sensing system including an antenna apparatus similar to that shown in FIGS. 12–14. It is illustrated for use in a planar configuration. In one embodiment a processor, preferably a microprocessor, controller 1601 regulates the operation of the active antenna apparatus 1621 and receives position data 1617 which it uses to determine the position of a stylus 1611 near active area 1609 proximate to the finger elements of antenna apparatus 1621. Controller 1601 also includes a user interface 1618 and an audio block 1619 for outputting an audio output via a speaker 1620.

As shown in FIG. 16, controller 1601 sends commands 1602 to transmitting logic block 1603 to cause a sequence of transmitting signals to perform a position detection function. The commands 1602 may include beginning and/or stopping position sensing. Additionally the commands 1602 may also be in regards to the desired resolution, i.e., commands 1602 may also include instruct transmitting block 1603 to adjust the mode of operation to achieve a desire resolution or speed for a particular application.

Transmitting block 1603 drives the two antennas of antenna apparatus 1620 according to predetermined multi-state drive sequence. In a preferred embodiment, two antennas each having a resistive voltage divider strip are used. The antennas are driven using the Five State Drive algorithm described above. The drive signals of transmitting logic block 1603 are preferably amplified with amplifiers 1604 and transmitted via wires having wire shielding 1605. Each antenna has two electrical contacts 1606 driving a resistive voltage divider 1607 which is used to supply the voltages to the fingers 1608 of each antenna.

Stylus 1610 has an conductive element which receives the transmitted signals. A conductor with a ground shield 1611 conducts the received signals to a receiving amplifier 1612. The receiving amplifier 1612 may perform any conventional gain, filtering, and DC rejection function to amplify and condition the received signals. The conditioned signals are set to signal detection block 1613 which performs demodulation, analog to digital conversion, and optionally integrated. In a preferred embodiment synchronous demodulation of a single frequency signal is used because this enhances the signal to noise ratio. However, synchronous demodulation requires timing signals 1615 and 1616 to coordinate the activities of signal detection block 1613. In a preferred embodiment, signal detection block 1613 integrates the signal to achieve narrow band filtering and uses a constant slope discharge technique to convert the integrated signal to a digital value for interpretation by the receive logic block 1614. The receive logic block 1614 directs the received signal detection process with receive timing signals 1616. For the case that synchronous demodulation is used, transmit timing information 1615 included with the receive timing signals 1616. The receive logic block 1614 accepts digital data from the receive signal detection block 1613 and formats the data as appropriate for delivery to controller 1601.

FIG. 17 is a block diagram showing a portion of the system of FIG. 16 in which the transmitting logic block 1603 and voltage resistive voltage divider 1607 are modified for improved position accuracy. As shown in FIG. 17, resistive voltage divider 1607 may include one or more additional input voltage taps to more precisely define the voltage along the resistive voltage divider 1607.

Figure 18:
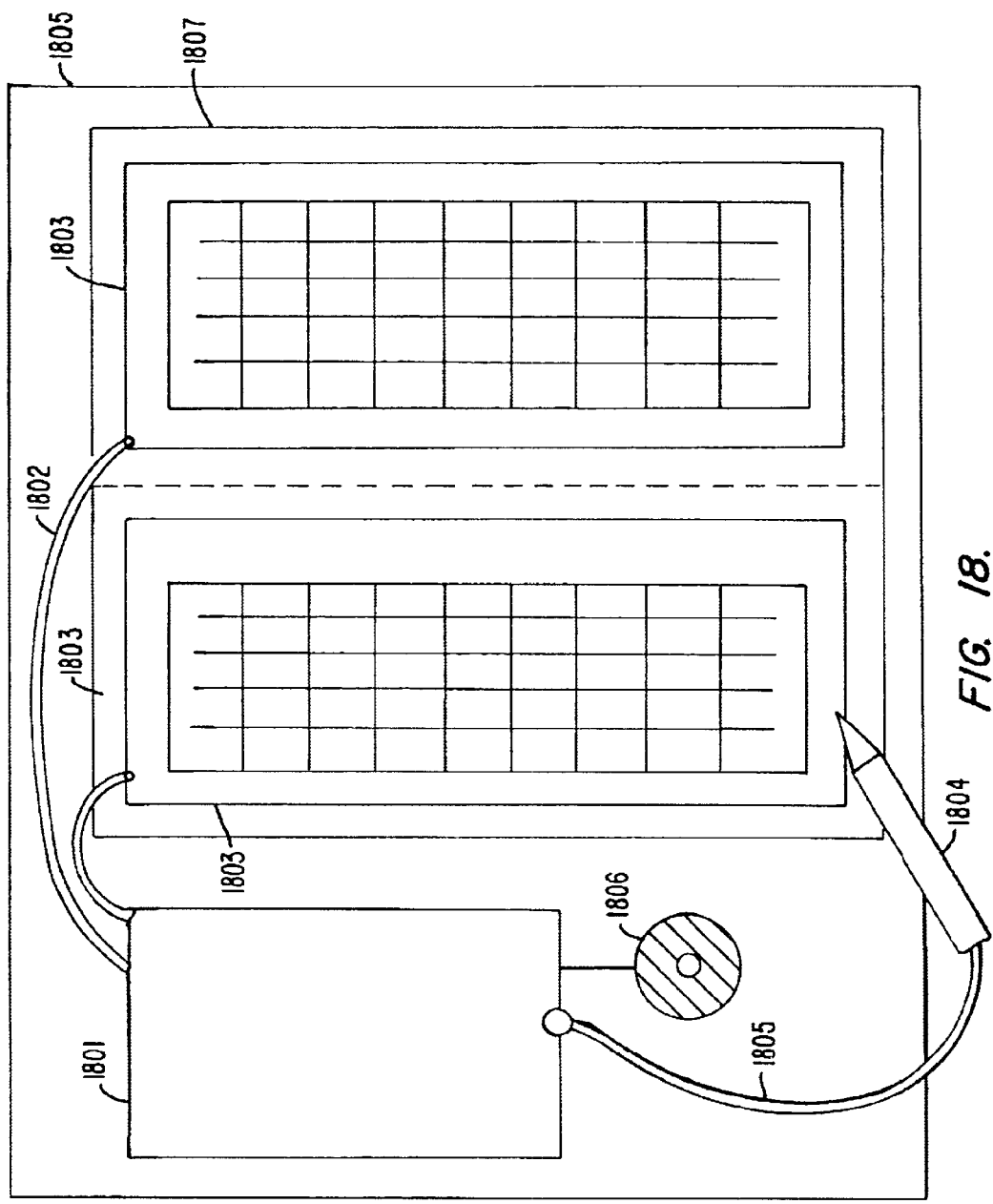
FIG. 18 is a block diagram of an electrographic position sensing system of the present invention for use in a document interpreting system.

One application of the antenna apparatus of the present invention was to create interactive books. As shown in FIG. 18, the sheets of a booklet 1807 were placed over an active surface having at least one antenna apparatus 1803 similar to the antenna apparatus 1609 of FIG. 16. A stylus 1804 was pointed at a portion of an open page of booklet 1807 to identify a word, letter, or picture. Microprocessor 1801 then calculated the position of stylus 1804 relative to antenna apparatus 1803. In a preferred embodiment, a speaker 1806 was used to provide an audio output as a function of the portion of booklet 1807 to which the user pointed stylus 1804. For comparable electronic accuracy, the resolution of the antenna apparatus 1621 of the present invention was about a factor of three higher than for previously constructed electrographic sensors in which the equipotential lines were generated within the body of a resistive surface. Further, the resolution was maintained at the edges of the antenna elements, unlike the solid resistive body which had up to four times less resolution near the edges.

In a preferred embodiment, the antenna system of the present invention is used to detect the position of a stylus over a platform. The dual transmitting rf antennas are located in the platform. A receiving antenna, or detector, is located in the stylus. This interactive print media or platform system is the subject of a patent application filed by the assignee of the present application. The co-pending application, incorporated herein by reference, is entitled "Interactive Platform and Locator System," Ser. No. 60/200,725, filed Apr. 27, 2000.

Figure 15C:
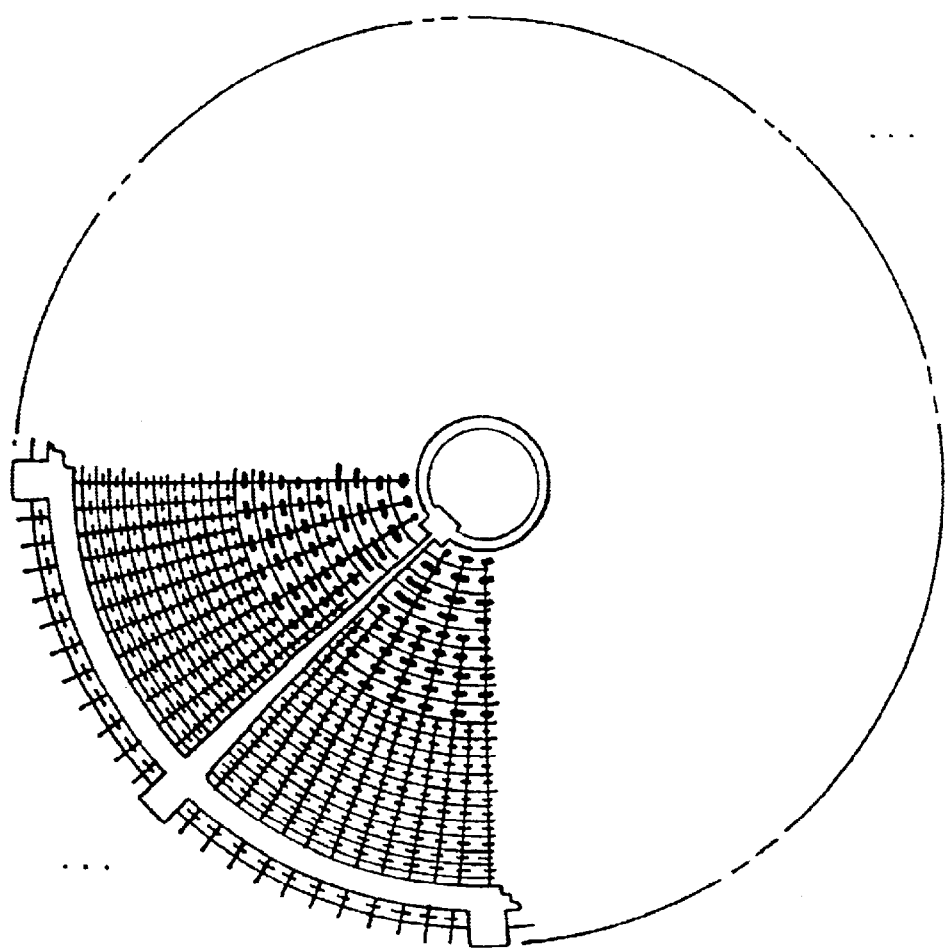
FIG. 15C shows a preferred embodiment of an antenna apparatus shaped to be molded into a hemispherical shape with the two antennas shown superimposed.
Figure 20:
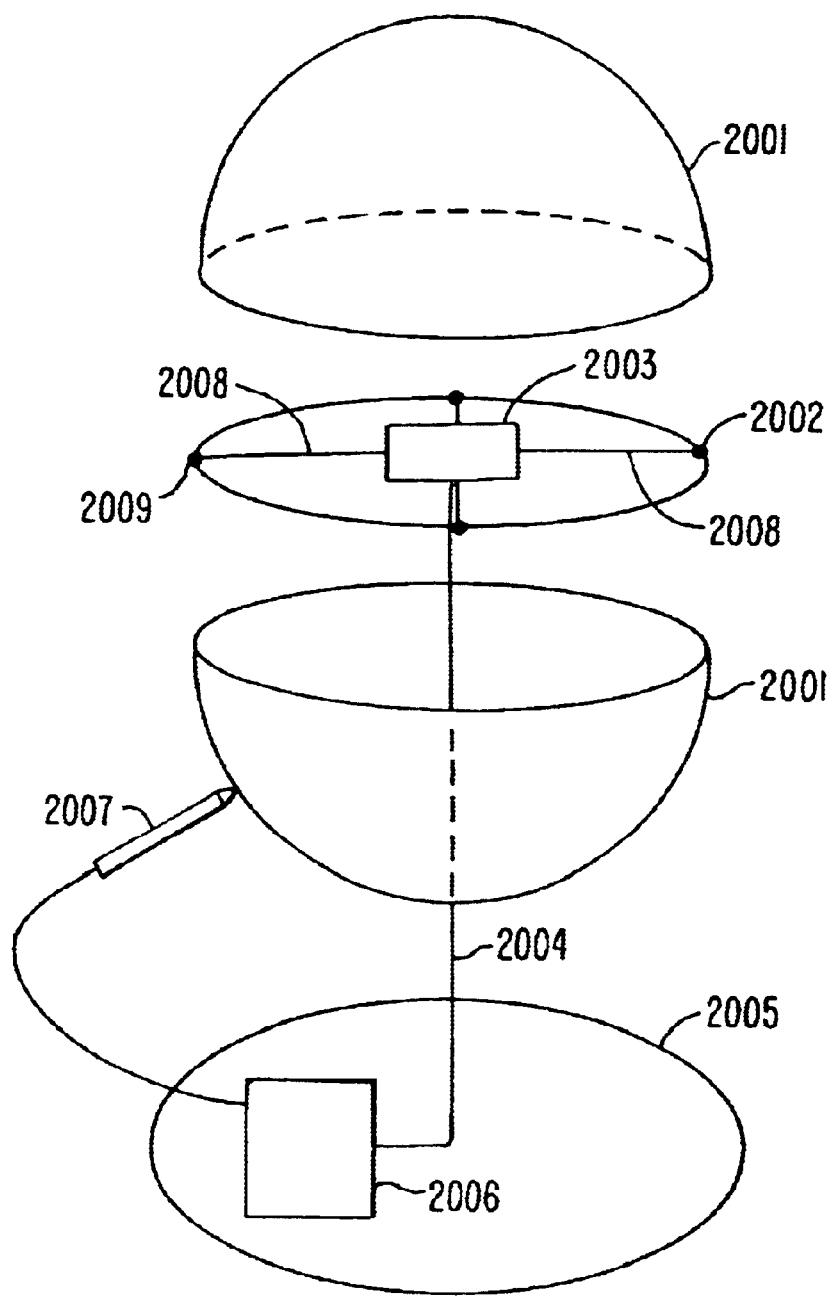
FIG. 20 is a schematic exploded diagram of the position sensing system of FIG. 19 in use.

One application of the antenna apparatus of the present invention is in a globe similar to that shown in FIG. 20. As shown in the rear view of FIG. 15A, one side of an planar insulative substrate 1505 is patterned with fingers 1510 shaped as concentric conductive rings. Each of the rings is coupled to a different portion of a resistive strip, with the resistive strip acting as a voltage divider dividing the voltage between contacts 1530, 1580. Consequently, each concentric ring will broadcast a different equipotential line. The opposed side of the insulating substrate is patterned with radially directed finger elements 1550. Each finger is coupled to a different node along a resistive voltage divider 1560 located at the circumference of the insulating substrate. The fingers 1550 may also be shaped with a non-uniform thickness in order to improve the electromagnetic characteristics of the antenna structure. The radial length of each finger may also be varied to alternate long and short radial fingers 1550 so that the azimuthal separation between finger elements is made more uniform. Some of the details and structure are omitted in FIGS. 15A and 15B for the purposes of illustration. FIG. 15C shows a preferred embodiment with the shape of the opposed antennas superimposed. The antenna apparatus is preferably fabricated on a vinyl substrate using an ink process to fabricate the resistive elements and the conductive fingers. The two opposed antennas define equipotential lines which are orthogonal to each other which are a simple function of radial (r, Θ) coordinates. The fabricated apparatus of FIG. 15C is then vacuum molded into a hemispherical shape.

Figure 19:
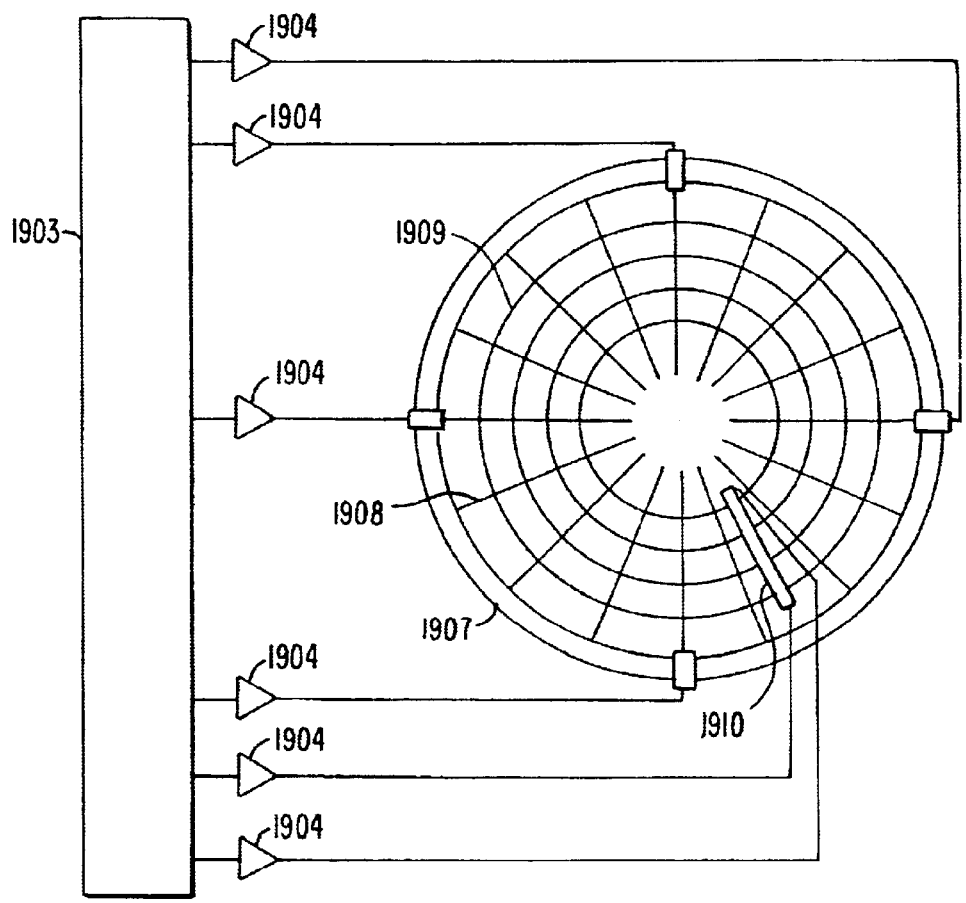
FIG. 19 is a block diagram of an electrographic position sensing system for use with a globe.

FIG. 19 is a schematic block diagram of a position sensing system with a hemispherical antenna system having a first antenna with radial finger elements 1908 coupled to a circumferential resistive element 1907 and a second antenna comprised of circular-shaped finger elements 1909 coupled to a radially, or longitudinally, oriented voltage divider 1910. Transmitting block 1903 and amplifiers 1904 are arranged to provide the drive signals to the antennas according to the Six State Drive Algorithm described above.

FIG. 20 shows an exploded perspective view of a globe having an antenna apparatus shaped as two hemispheres 2001, a plastic disk 2002 which supports a transmitting logic block 2003. Electrical contact wires 2008 couple transmitting logic block 2003 to electrical clips 2009. Transmitting logic block 2003 is electrically coupled to a support stem 2004 to provide a connection to main electronics unit 2006 containing a microprocessor controller (not shown in FIG. 20). A stylus 2007, which has a receiving antenna for receiving signals, is coupled to main electronics unit 2006. The globe is preferably supported by a base 2005.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

I claim:

1. A method for locating a user selected position over an antenna apparatus comprising the steps of:
    a) providing a first transmitting antenna, the first antenna comprising a first voltage divider having at least two electrical contacts coupled to it, and a plurality of spaced apart, substantially parallel, electrically conductive, finger elements coupled to the first voltage divider between the at least two electrical contacts;
    b) providing an electrical insulator to separate the first transmitting antenna from a second transmitting antenna;
    c) providing the second transmitting antenna comprising a second voltage divider having at least two electrical contacts coupled to it, and a plurality of spaced apart, substantially parallel, electrically conductive, finger elements coupled to the second voltage divider between the at least two electrical contacts, the second transmitting antenna oriented so that the area defined by its finger elements overlay a portion of the area defined by the finger elements of the second antenna, and the finger elements of the first antenna form a non-zero angle with the finger elements of the second antenna;
    d) providing a processor coupled to a user interface and further coupled through other electronics to the first voltage divider at two or more electrical contacts and coupled to the second voltage divider at two or more electrical contacts;
    e) providing a drive signal transmitter coupled between the processor and through amplifiers to the first voltage divider at two or more electrical contacts and through amplifiers to the second voltage divider at two or more electrical contacts, the transmitter capable of receiving commands from the processor and transmitting signals to the first and second voltage dividers independently;
    f) providing a receiving antenna coupled to an amplifier, the amplifier coupled to the processor;
    g) providing a signal detector coupled between the receiving antenna amplifier and the processor;
    h) providing a signal receiver coupled between the signal detector and the processor, the signal receiver further coupled to the drive signal transmitter;
    i) placing the receiving antenna at a position over the area where the finger elements of the first and second antenna overlap;
    j) causing the processor to send commands to the drive signal transmitter, the commands causing the transmitter to send a sequence of five drive-signal states to the first and second voltage dividers independently, the five states being:
        i) applying zero voltage to the first and the second voltage dividers;
        ii) applying a gradient voltage to the voltage divider of the first, top, antenna and zero voltage to the second, bottom, antenna;
        iii) applying a constant voltage to the voltage divider of the first, top, antenna and zero voltage to the second, bottom, antenna;
        iv) applying a gradient voltage to the voltage divider of the second, bottom, antenna and zero voltage to the first, top, antenna; and
        v) applying a constant voltage to the voltage divider of the second, bottom, antenna and zero voltage to the first, top, antenna;
    k) receiving a signal measurement from the receiving antenna during each drive state;
    l) detecting a magnitude of the measured signal data from the receiving antenna and sending to the signal receiver;
    m) synchronizing the received signal data with timing data obtained from the drive signal transmitter; and
    n) calculating the position of the receiving antenna from the measured signal data.

2. The method of claim 1 wherein the position of the receiving antenna is calculated according the following steps:

a) subtracting the signal magnitude data measured at state (i) from the signal magnitude measured at each of the four other states, to yield:

$P_{Top-G}$=the signal magnitude measure at state (ii) less the signal magnitude data measured at state (i);

$P_{Top-C}$=the signal magnitude measure at state (iii) less the signal magnitude data measured at state (i);

$P_{Bottom-G}$=the signal magnitude measure at state (iv) less the signal magnitude data measured at state (i);

$P_{Bottom-C}$=the signal magnitude measure at state (v) less the signal magnitude data measured at state (i);

b) obtaining a single data point relating to the measurements taken from the top antenna, $P_{Top}$, by calculating the ratio of $P_{Top-G}/P_{Top-C}$;

c) obtaining a single data point relating to the measurements taken from the bottom antenna, $P_{Bottom}$, by calculating the ratio of $P_{Bottom-G}/P_{Bottom-C}$; and d) determining the positional meaning of $P_{Top}$ and $P_{Bottom}$ based on a model of a field radiated by the transmitting antennas.

3. The method of claim 3 wherein the position of the receiving antenna is calculated by the additional step of compensating for variance in resistance in each voltage divider after $P_{Top}$ and $P_{Bottom}$ are calculated.

4. The method of claim 3 further comprising the step of compensating for nonlinear variation along any voltage divider by providing an algorithm in the processor, the algorithm containing correction parameters for a one-dimensional voltage divider.

5. A method for locating a user selected position over an antenna apparatus wherein one antenna has a loop voltage divider, comprising the steps of:

a) providing a first transmitting antenna, the first antenna comprising a first voltage divider having at least two electrical contacts coupled to it, the first, and a plurality of spaced apart, electrically conductive, finger elements coupled to the first voltage divider between the at least two electrical contacts;

b) providing an electrical insulator to insulate the components of the first transmitting antenna from a second transmitting antenna;

c) providing the second transmitting antenna, the second antenna comprising a second voltage divider shaped in a loop and having at least three electrical contacts at intervals along the loop, and a plurality of spaced apart, low resistance, finger elements coupled to the second voltage divider at intervals between each two of the at least three contacts, such that the electrical potential along a each element is substantially uniform and the elements are oriented at a substantially a constant angle with a tangent of the loop where each element couples to the loop;

d) orienting the finger elements of the first antenna to define the area enclosed by the loop of the second voltage divider, and orienting the fingers of the second antenna to lie within the loop of the second voltage divider, wherein the first antenna is oriented so that the area defined by the finger elements of the first antenna overlay a portion of the area defined by the finger elements of the second antenna; and the finger elements of the first antenna form a non-zero angle with the finger elements of the second antenna;

e) providing a processor coupled to a user interface and further coupled through other electronics to the first voltage divider at two or more electrical contacts and coupled to the second voltage divider at three or more electrical contacts;

f) providing a drive signal transmitter coupled to the processor and through amplifiers to the first voltage divider at two or more electrical contacts and coupled through amplifiers to the second voltage divider at three or more electrical contacts, the transmitter capable of receiving commands from the processor and transmitting signals to the first and second voltage dividers independently;

g) providing a receiving antenna coupled to an amplifier, the amplifier coupled to the processor;

h) providing a signal detector coupled between the receiving antenna amplifier and the processor;

i) providing a signal receiver coupled between the signal detector and the processor, the signal receiver further coupled to the drive signal transmitter;

j) placing the receiving antenna at a position over the area where the finger elements of the first and second antenna overlap;

k) causing the processor to send commands to the drive signal transmitter, the commands causing the transmitter to send a sequence of six drive-signal states to the first and second voltage dividers independently, the six states being:

i) applying zero voltage to the first and the second voltage dividers;

ii) applying a gradient voltage to the voltage divider of the first, top, antenna and zero voltage to the second, bottom, antenna;

iii) applying a constant voltage to the voltage divider of the first, top, antenna and zero voltage to the second, bottom, antenna;

iv) applying a first gradient voltage to two or more of the at least three contacts of the voltage divider of the second, bottom, antenna and applying zero voltage to the first, top, antenna;

v) applying a second gradient voltage to two or more of the at least three contacts of the voltage divider of the second, bottom, antenna and applying zero voltage to the first, top, antenna;

vi) applying a constant voltage to the voltage divider of the second, bottom, antenna and zero voltage to the first, top, antenna;

l) receiving a signal measurement from the receiving antenna during each drive state;

m) detecting a magnitude of the measured signal data from the receiving antenna and sending to the signal receiver;

n) synchronizing the received signal data with timing data obtained from the drive signal transmitter; and o) calculating the position of the receiving antenna from the measured signal data.

6. The method of claim 5 wherein the position of the receiving antenna is calculated according the following steps:

a) subtracting the signal magnitude data measured at state (i) from the signal magnitude measured at each of the five other states, to yield:

$P_{Top-G}$=the signal magnitude measure at state (ii) less the signal magnitude data measured at state (i);

$P_{Top-C}$=the signal magnitude measure at state (iii) less the signal magnitude data measured at state (i);

$P_{Bottom-G1}$=the signal magnitude measure at state (iv) less the signal magnitude data measured at state (i);

$P_{Bottom-G2}$=the signal magnitude measure at state (v) less the signal magnitude data measured at state (i);

$P_{Bottom-C}$=the signal magnitude measure at state (vi) less the signal magnitude data measured at state (i);

b) obtaining a single data point relating to the measurements taken from the top antenna, $P_{Top}$, by calculating the ratio of $P_{Top-G}/P_{Top-C}$;

c) obtaining two data points relating to the measurements taken from the bottom antenna, $P_{Bottom-G1}$ and $P_{Bottom-G2}$ by calculating the ratios of $P_{Bottom-G1}/P_{Bottom-C}$ and $P_{Bottom-G2}/P_{PBottom-C}$ respectively; and d) determining the positional meaning of $P_{Top}$, $P_{Bottom-G2}$, and $P_{Bottom-G1}$, based on a model of a field radiated by the transmitting antennas.

7. The method of claim 6 wherein the position of the receiving antenna is calculated by the additional step of compensating for variance in resistance in each voltage divider after $P_{Top}$ and $P_{Bottom}$ are calculated.

8. The method of claim 6 further comprising the step of compensating for nonlinear variation along any voltage divider by providing an algorithm in the processor, the algorithm containing correction parameters for a one-dimensional voltage divider.

9. The method of claim 2 further comprising the step of shaping the first and second transmitting antennas and insulator substantially into a hemisphere and orienting the finger elements of the first antenna to substantially encircle the hemisphere along a latitude and orienting the fingers of the second antenna to substantially lie along longitudes of the hemisphere.

* * * * *